US012782788B2

(12) United States Patent
Marchewka et al.

(10) Patent No.: US 12,782,788 B2
(45) Date of Patent: Nov. 3, 2026

(54) ELECTROPHORETIC DISPLAY DEVICES

(71) Applicant: HALION DISPLAYS INC., Kitchener (CA)

(72) Inventors: Ryan Phillip Marchewka, Waterloo (CA); Matthew Thomas Lavrisa, Ottawa (CA)

(73) Assignee: HALION DISPLAYS INC., Kitchener (CA)

( * ) Notice: Subject to any disclaimer, the term of this patent is extended or adjusted under 35 U.S.C. 154(b) by 0 days.

(21) Appl. No.: 18/289,498

(22) PCT Filed: May 5, 2022

(86) PCT No.: PCT/IB2022/054176
§ 371 (c)(1),
(2) Date: Nov. 3, 2023

(87) PCT Pub. No.: WO2022/234518
PCT Pub. Date: Nov. 10, 2022

(65) Prior Publication Data
US 2024/0241421 A1 Jul. 18, 2024

Related U.S. Application Data

(60) Provisional application No. 63/184,446, filed on May 5, 2021.

(51) Int. Cl.
*G02F 1/1676* (2019.01)
*G02F 1/1334* (2006.01)
(Continued)

(52) U.S. Cl.
CPC .......... *G02F 1/1676* (2019.01); *G02F 1/1334* (2013.01); *G02F 1/13756* (2021.01);
(Continued)

(58) Field of Classification Search
CPC ................. G02F 1/1676; G02F 1/1334; G02F 1/13756; G02F 1/167; G02F 1/16757;
(Continued)

(56) References Cited

U.S. PATENT DOCUMENTS

| | | | | |
|---|---|---|---|---|
| 6,727,873 | B2 * | 4/2004 | Gordon, II | G09G 3/344 345/107 |
| 2003/0173890 | A1 | 9/2003 | Yamazaki et al. | |
| 2011/0235161 | A1 * | 9/2011 | Joo | G02F 1/1685 359/296 |
| 2012/0218312 | A1 * | 8/2012 | Goldsmith | G09G 3/344 345/690 |

(Continued)

FOREIGN PATENT DOCUMENTS

| | | |
|---|---|---|
| WO | WO-9910768 A1 | 3/1999 |

*Primary Examiner* — Benjamin C Lee
*Assistant Examiner* — Emily J Frank
(74) *Attorney, Agent, or Firm* — Perry + Currier Inc.

(57) ABSTRACT

An example electrophoretic display device includes: an outer substrate and an inner substrate; and at least one color-changing layer comprising: a plurality of driven electrodes and at least one reference electrode; a plurality of microstructures disposed between the driven electrodes and the reference electrode, the microstructures containing an electrophoretic media; and a controller coupled to the driven electrodes, the controller configured to: obtain image data representing an image to be displayed by the electrophoretic display device; select a subset of the driven electrodes based on a mapping of the image data to the driven electrodes; and drive the subset of driven electrode to induce a voltage difference to change the electromagnetic field applied to the electrophoretic media in the microstructures aligned with the subset of driven electrodes.

19 Claims, 23 Drawing Sheets

(51) Int. Cl.

| | |
|---|---|
| ***G02F 1/137*** | (2006.01) |
| ***G02F 1/167*** | (2019.01) |
| ***G02F 1/16757*** | (2019.01) |
| ***G02F 1/1677*** | (2019.01) |
| ***G02F 1/1685*** | (2019.01) |
| ***G09G 3/16*** | (2006.01) |
| ***G09G 3/34*** | (2006.01) |

(52) U.S. Cl.

CPC .......... *G02F 1/167* (2013.01); *G02F 1/16757* (2019.01); *G02F 1/1677* (2019.01); *G02F 1/1685* (2019.01); *G09G 3/16* (2013.01); *G09G 3/344* (2013.01); *G02F 2203/02* (2013.01)

(58) Field of Classification Search

CPC ................. G02F 1/1677; G02F 1/1685; G02F 2203/02; G09G 3/16; G09G 3/344; G09F 9/372; G09F 9/3023

See application file for complete search history.

(56) References Cited

U.S. PATENT DOCUMENTS

| | | | | |
|---|---|---|---|---|
| 2012/0223929 | A1* | 9/2012 | Sato | G02F 1/167 345/107 |
| 2013/0206316 | A1 | 8/2013 | Liu | |
| 2017/0315418 | A1* | 11/2017 | Paolini, Jr. | G09G 3/2003 |
| 2018/0101081 | A1* | 4/2018 | Xu | G02F 1/134309 |
| 2018/0120665 | A1* | 5/2018 | Harris | G09F 9/301 |
| 2020/0192176 | A1* | 6/2020 | Bull | C09D 5/24 |
| 2021/0382367 | A1* | 12/2021 | Hashimoto | G06F 1/1652 |
| 2022/0082896 | A1* | 3/2022 | Telfer | G02F 1/16753 |

* cited by examiner

1800

ELECTROPHORETIC DISPLAY DEVICES

FIELD

The specification relates generally to display devices, and more particularly to electrophoretic display devices.

BACKGROUND

Various technologies are employed in the manufacture of display panels. Some, e.g. liquid crystal and electrowetting displays, suffer from optical losses, leading to inefficient use of backlight. Others, such as electrochromic displays, suffer from slow response times and increased voltage requirements to drive pixels compared to LCD and electrowetting displays.

SUMMARY

According to an aspect of the present specification, an electrophoretic display device includes: an outer substrate and an inner substrate; and at least one color-changing layer comprising: a plurality of driven electrodes and at least one reference electrode, the driven electrodes and the reference electrode disposed in a spaced apart relationship between the inner substrate and the outer substrate; a plurality of microstructures disposed between the driven electrodes and the reference electrode, the microstructures containing an electrophoretic media, the electrophoretic media comprising a first chemical entity and a second chemical entity inducible to reversibly switch between a separated state and an optically active state in response to a change in an electromagnetic field to change an optical property of the electrophoretic media; and a controller coupled to the driven electrodes, the controller configured to: obtain image data representing an image to be displayed by the electrophoretic display device; select a subset of the driven electrodes based on a mapping of the image data to the driven electrodes; and drive the subset of driven electrode to induce a voltage difference to change the electromagnetic field applied to the electrophoretic media in the microstructures aligned with the subset of driven electrodes.

According to another aspect of the present specification, an electrophoretic display device includes: an outer substrate and an inner substrate; at least one color-changing layer comprising: a driven electrode and a reference electrode, the driven electrode and the reference electrode disposed in a spaced apart relationship between the inner substrate and the outer substrate; a plurality of microstructures disposed between the driven electrode and the reference electrode, the microstructures containing an electrophoretic media, the electrophoretic media comprising a first chemical entity and a second chemical entity inducible to reversibly switch between a separated state and an optically active state in response to a change in an electromagnetic field to change an optical property of the electrophoretic media; and a controller coupled to the driven electrode, the controller configured to drive the driven electrode to induce a voltage difference to change the electromagnetic field applied to the electrophoretic media; and a light transformation layer configured to transform light passing through the color-changing layer according to a viewing parameter.

BRIEF DESCRIPTION OF THE DRAWINGS

Implementations are described with reference to the following figures.

DETAILED DESCRIPTION

Figure 1A:
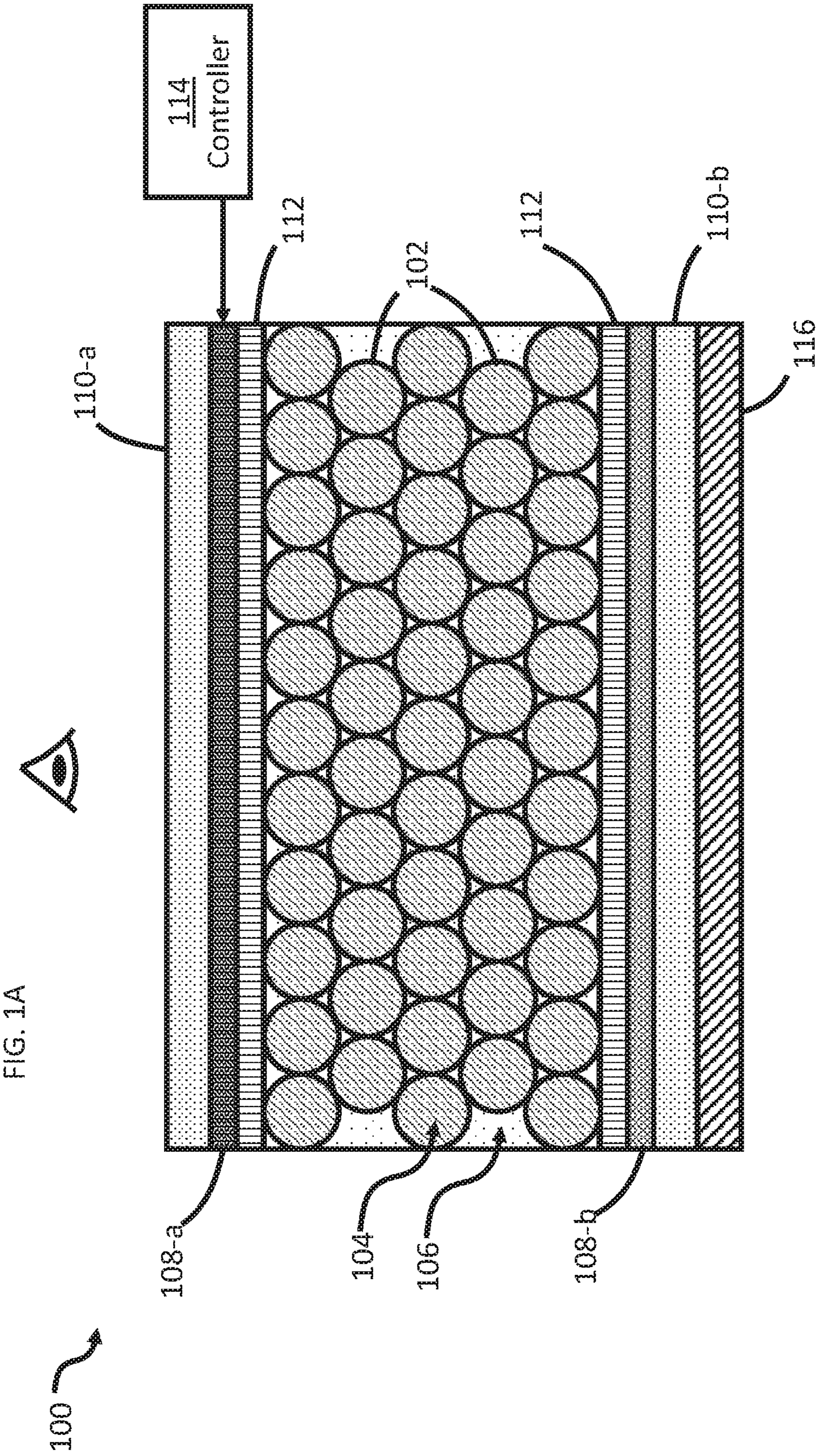
FIG. 1A is a schematic diagram illustrating an example display stack in accordance with the present disclosure.

Emissive displays display images by producing typically red, green and blue light in a spatially arranged way so as to evoke the sensation of seeing a whole image. There are a wide range of ways in which this is achieved, but typically follow one of two strategies. In the first strategy, the device starts with light emitted uniformly across the surface of the display from a backlighting system of some sort, and then some or all wavelengths are selectively removed. In the second strategy, the light is produced only at the location on the screen where the viewer will see that light. The second strategy is more power efficient since in the first case, the absorbed light is converted to waste heat, whereas in the second case, there is little or no light intentionally wasted.

Emissive displays have two primary drawbacks. The first is that they must shine at least as brightly as their environment in order to achieve good contrast. Since the human eye adjusts to the lighting conditions it's in after an adjustment period, a display seen in the lighting of a building with no brightness adjustment appears nearly impossible to see when viewed outdoors on a sunny day. The light coming from other objects in the environment is much more intense and causes the eye to become less sensitive to light. The display must increase its brightness significantly in order to achieve suitable contrast for the viewer. The second problem is that because the display is constantly producing light, it needs to constantly draw power to produce that light. Other problems involve the mismatch of the display's brightness to the environment's brightness which can lead to eye fatigue, and excessive brightness at night can also lead to insomnia.

Reflective displays hold the promise of solving these problems. These displays do not need to produce light themselves, but instead make use of light already in the environment reflecting off of them. Reflective displays selectively change which wavelengths of light are able to reflect off of them or pass through them, and in what proportion. By varying which colors are absorbed or reflected on different parts of the display and updating these areas periodically, varying information can be displayed to the user. Existing reflective displays have suffered from a number of other issues. These primarily include slow refresh rates in which the display cannot display smooth-looking video, low reflectance in which the display looks grey and faded under all but the brightest environments, and a small color gamut.

The above problems may be avoided by using an electrophoretic media; a detailed discussion of the electrophoretic media is provided in PCT application no. PCT/IB2019/058306 filed Sep. 30, 2019, the contents of which is incorporated herein by reference. In brief, the electrophoretic media (alternately referred to herein as an electrophoretic dispersion) allows light to be selectively absorbed by display elements by bringing into contact two component chemical entities. When these entities form a molecular complex, the optical properties of the complex is different than the optical properties of the separated components. An electrophoretic dispersion where one particle type carries one of the components and another particle type carries the other, and in which the two particle types carry an opposite electrical charge may achieve this purpose. When no electric field is applied, the particles are attracted to one another by electrostatic interactions, causing the component chemical entities to come into contact, and changing the macroscopic optical characteristics of the dispersion. When an electric field is applied, the oppositely charged particles are pulled apart, the complexes that formed are split into the component chemical entities, and the optical properties of the dispersion match that of the separated entities.

The electric field required to drive the display is typically produced by applying a voltage difference between two substantially parallel and conductive electrodes. In order to keep the power consumption low, microstructures may be provided which act to limit the total travel distance of the electrophoretic particles in the direction of the electric field. Example microstructures are described in PCT application no. PCT/IB2020/051686 filed Feb. 27, 2020, the contents of which is incorporated herein by reference. In other examples, other microstructures, such as microspheres, are also contemplated. The total charge on the electrodes when the electric field is being applied need only be proportional to the first layer of charges in the electrophoretic particles adjacent to the electrodes. This takes advantage of Gauss's law, where the produced electric field is used to separate the first layer of particles, but this produces an electric field which in turn separates the next layer of particles, and this continues through all of the microstructures between the pair of electrodes. The microstructures may take on numerous different forms, as long as they fulfill the basic criteria of restricting movement of the electrophoretic particles in the direction of the applied electric field. The hollow spherical microstructures with in-plane transparent electrodes are used throughout the disclosure as examples, but other suitable microstructure and electrode combinations may be substituted without loss of generality.

FIG. 1A is a schematic diagram illustrating a single layer display stack 100, comprised of a set of microstructures 102 containing the described electrophoretic dispersion 104 and dispersed in dispersion fluid 106. In one example there are two electrodes 108 which may be deposited onto transparent solid substrates 110, in one example the substrate is a type of glass, in another example the substrate is a flexible material such as a type of optically clear plastic such as polyethylene terephthalate, polycarbonate, poly(methylmethacrylate), polyester or others. In a preferred embodiment, the electrodes 108 are composed of a transparent conductor, such as indium tin oxide, indium gallium zinc oxide, aluminum doped zinc oxide, silver nanowires, poly(3,4-ethylenedioxythiophene) polystyrene sulfonate, or other examples. The electrodes 108 may be coated with a thin, substantially transparent dielectric barrier 112 which is insoluble in the dispersion fluid 106, such as silicon nitride, silicon dioxide, crosslinked polystyrene, or other materials. This dielectric barrier 112 prevents the electrolysis of the fluid by the electrodes which may happen if the electrodes 108 are in contact with the fluid 106.

One or both electrodes 108 are connected to a controller 114 which sends voltage signals to the electrodes 108. In FIG. 1A, the controller is connected to the electrode closest to the viewer, referred to as the driven electrode 108-*a*. The electrode which is not the driven electrode is referred to as the reference electrode 108-*b*. The driven electrode may be on the side of the display closer to the viewer as shown in this example, or may switch places with the reference electrode from what this figure depicts.

In some examples, controller 114 implements techniques referred to as frame inversion methods, whereby the voltage applied across a pixel or segment is substantially reversed each time controller updates the voltage of that pixel or segment. This technique may vary all of the pixels or segments of the display together, or in alternating rows or columns, or a checkerboard pattern, or other patterns.

In some examples, the substrate farthest from the viewer 110-*b* is opaque, such as a metallic layer, or optically opaque polymer. In the case of a metallic layer, that layer may act as the reference electrode 108-*b* instead of requiring a transparent conductor to fulfill this role. The dielectric barrier may still be preferable in these examples to prevent electrolysis of the fluid by the electrodes.

In other examples where the substrate farthest from the viewer 110-*b* is optically transparent, on the far side of the substrate farthest from the viewer, a light reflecting layer 116 may be added. In a preferred embodiment, this light reflecting layer 116 is a highly reflective white layer that exhibits an approximately Lambertian reflection profile, so that the surface appears approximately uniform in brightness when viewed from any angle under a uniform illuminance. Objects which have an approximately Lambertian reflection profile appear to be more ordinary and familiar, whereas emissive displays tend not to match the brightness of their environments and their brightness changes noticeably as the viewing direction changes.

In other embodiments, this light reflecting layer 116 may take on other visual appearances, such as a uniform color, a patterned or motif, an image, a reflective hologram, or any other visual appearance. Reflection from this surface may be diffuse, as with wood or stone or the above mentioned white reflective layer, or may be purely specular, as with a mirror, or may exhibit partially both diffuse and specular reflection characteristics.

In another embodiment, the light reflecting layer 116 may be specifically designed to reflect light in particular directions, for example to enhance the brightness to the viewer when viewed from directly perpendicular to the display. It may also limit the light which leaves the display at angles far from the perpendicular to aid in keeping the information on the display private. It may also reflect light in several specific directions, giving the display the ability to show holographic images.

In another embodiment, the light reflecting layer 116 may be a switchable polymer dispersed liquid crystal (PDLC) device, which can alter its opacity. The PDLC device may switch states between a white opaque layer and a transparent layer, changing the opacity of the entire display stack. The PDLC device may have multiple addressable regions such that different areas of the display device 100 have different opacities. This may be useful in for example a display device on a window, which may display information. Because the scenery visible through the window may contain a lot of high frequency information, the viewer of the example display device may find it hard to see and read the information presented by the display, and the PDLC layer can remove this distracting high frequency information when the display is needed, but revert back to a window when the display is not needed.

In other embodiments, there is no light reflecting layer, and the display is partially or substantially transparent to some or all visible wavelengths. In some embodiments, there may be no additional layer to give color, only the substrate. One or both of the substrates 110 may be substantially optically transparent, or may scatter light somewhat and appear hazy, or one or both of the substrates may absorb some fraction of some wavelengths of light giving the display a visible color or tint. In other embodiments, the substrates may vary spatially in which regions absorb which wavelengths to different degrees, giving the appearance of a patterned surface, any other motif, an image, or any other visual appearance. Some regions of the substrates may be more or less reflective to light, whether by specular reflection or by diffuse scattering.

In other embodiments, the light reflecting layer 116 may be a suitable light transformation layer to transform light passing through the color-changing layer according to a viewing parameter. Preferably, the viewing parameter may optimize the viewing experience of a viewer by enhancing brightness along the typical viewing direction, and may include, for example, considerations of ambient lighting, a particular application of the display device, or the like. The light transformation layer may, for example, produce the above-mentioned visual effects as well, they need not be produced by the substrate. The light transformation layer may alter the polarization of the light, may absorb light of some polarizations, may be a transmissive hologram.

In some embodiments, both sides of the display are visible to the viewer, when the display is partially or substantially transparent to light.

Figure 1B:
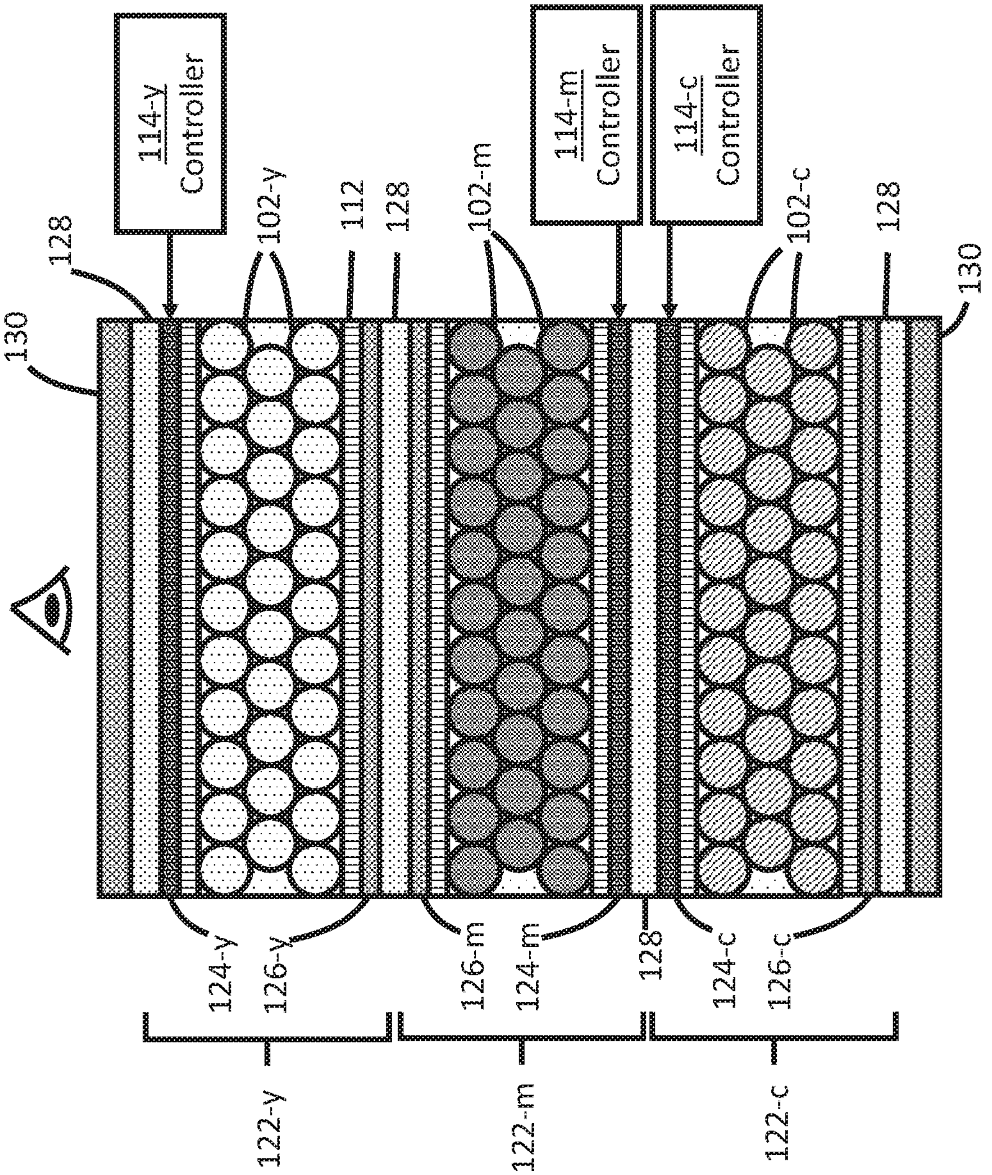
FIG. 1B is a schematic diagram illustrating another display stack in accordance with the present disclosure.

FIG. 1B is a schematic diagram showing another embodiment of the present invention, a multi layered display stack 120 with three color-changing layers 122 of microstructures 102 containing color-changing electrophoretic dispersion 104. Each layer has microstructures containing a different electrophoretic dispersion, each with an ability to turn from clear to a different color. In a preferred embodiment, the color-changing layers 122 are in order of increasing distance from the viewer are yellow, magenta and cyan. In other embodiments the order is different. Such a combination of colors can be used to address a large part of the possible color gamut which humans can perceive. Other numbers of color-changing layers 122 and other color combinations may be chosen, depending on the desired application.

In the present example, the driven electrodes 124 may be swapped with the reference electrode 126 within each color changing layer 122. The driven electrodes 124 may preferably each be connected to a different controller 114 so that they may be sent different voltage signals to reproduce different colors within the display's color gamut. These may be made of transparent conductive materials as with electrodes 108 of FIG. 1A.

The color-changing layers 122 may still require the addition of the dielectric barriers 112 to prevent the electrolysis of the dispersion fluid 106. Separating layers 128 may also be provided. These may be the substrates 110 from FIG. 1A. They may provide structural support for the electronics associated with driven and reference electrodes as well as the electrodes themselves, they may also provide optical properties beneficial to the display as a whole, such as reducing the reflection between layers.

Either outer surface of the display device may include additional layers 130, such as optical layers which control the way light interacts with the display device or reduces the reflectivity of the surface as with an anti-reflective coating. In another example the additional layers 130 may include materials which absorb ultraviolet light which may damage the internal components of the display device. The additional layers 130 may also include layers which change the physical texture of the surface. In one example the display is given a texture which feels like paper so that using the display with a stylus feels like writing with a pen or pencil on paper. In another example, a coating is provided to reduce the coefficient of friction between human skin and the surface of the display. In another example the display may include an oleophobic coating which repels oily substances, which may be preferred for devices with an ability to sense the presence of fingers touching the display.

In one embodiment, the additional layers 130 may include a layer of electronics which provide the ability to sense the presence of objects such as fingers or a stylus touching the display. In one example this is a capacitive touch sensitive layer. This may be used to provide feedback to the device, which can then update its display, providing interactivity with the device. Such a layer may be provided on both sides of the multi layered display stack 120.

It may be preferable in the case where there are multiple layers with pixels or segments to carefully align the layers to reduce color reproduction errors and colored edge effects that may occur if the layers are out of alignment.

It may be preferable in a multi layer display stack to keep all of the layers especially the separating layers as thin as possible so as to reduce the overall thickness of the display stack.

Figure 2C:
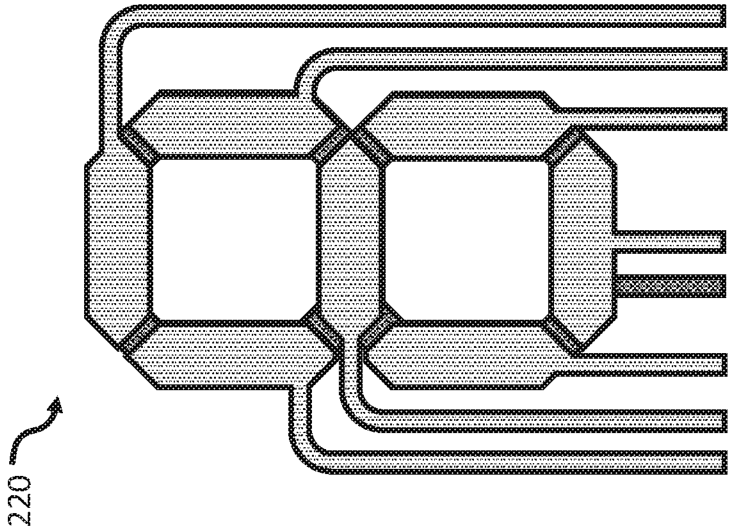
FIG. 2C is a schematic diagram of the alignment of the two electrode patterns of FIG. 2A and FIG. 2B in an assembled display.
Figure 2B:
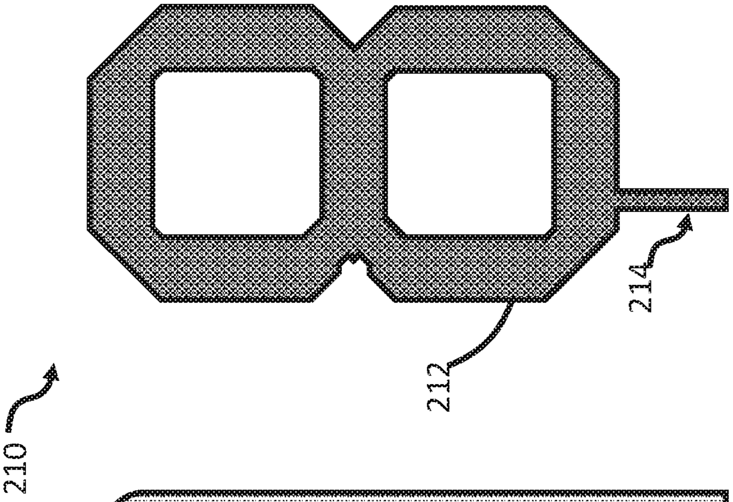
FIG. 2B is a schematic diagram of an example segmented display reference electrode pattern.
Figure 2A:
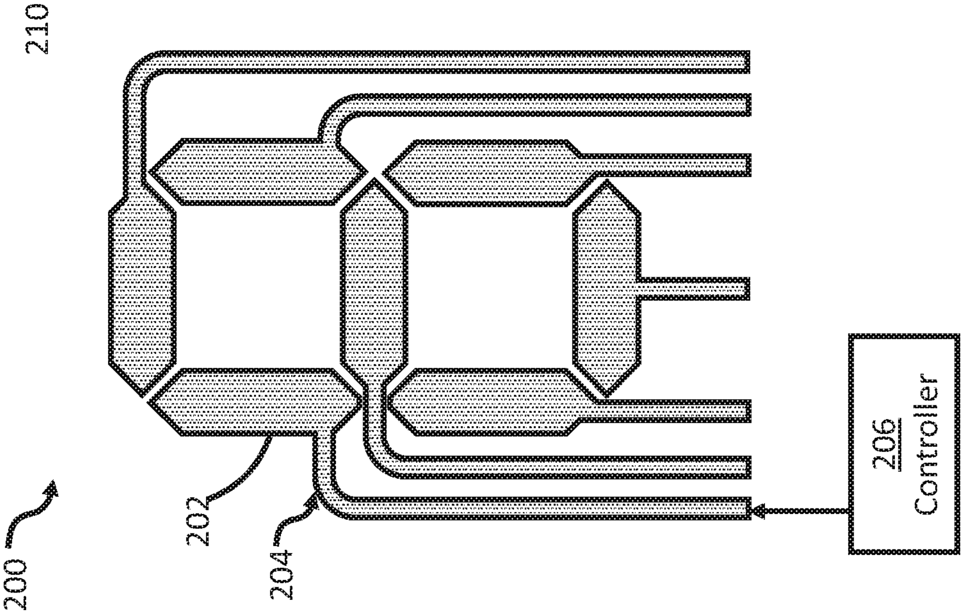
FIG. 2A is a schematic diagram of an example segmented display driven electrode pattern.

FIG. 2A is a schematic diagram of an example segmented display driven electrode pattern 200. This pattern is made up of one or more segments 202 which make up the driven electrode of one color-changing layer. These segments 202 may be made of transparent conductor, or of an opaque conductor if they are not on the side of the viewer. This is an example method for varying the applied electric field over the surface of the display to form an image, referred to as a segmented display. Each of the segments 202 is connected to the edge of the display by a trace 204 made up of a conductive material, preferably the same conductive material as the segments 202. Each of the segments 202 is connected to a controller 206 which may be common to all of the segments 202, and which supplies a voltage to the segment so that the voltage difference between the segment and the reference electrode produces an electric field to actuate the electrophoretic dispersion's color.

FIG. 2B. is a schematic diagram of an example segmented display reference electrode pattern 210. This pattern is made up of one or more segments 212 which make up the reference electrode of one color-changing layer. These segments 212 may be made of transparent conductor, or of an opaque conductor if they are not on the side of the viewer. These segments are connected via traces 214 to the display's common voltage.

FIG. 2C. is a schematic diagram of the alignment of the two electrode patterns of FIG. 2A and FIG. 2B in an assembled display. Because the electrophoretic dispersion's color is actuated by an electric field, and the electric field around the traces is small because it there is no counter electrode present opposite them in the assembled display, the dispersion beneath or above the traces is not actuated. The region which is actuated is approximately the intersection of the driven electrode and reference electrode when viewed in this manner. Other patterns of electrodes may be used depending on the information which is to be displayed. The driving method discussed in this example is referred to as direct drive. The configuration of the segments may allow for other driving methods, which may reduce the number of inputs required to drive the segments independently which may occur to those skilled in the art.

Figure 3A:
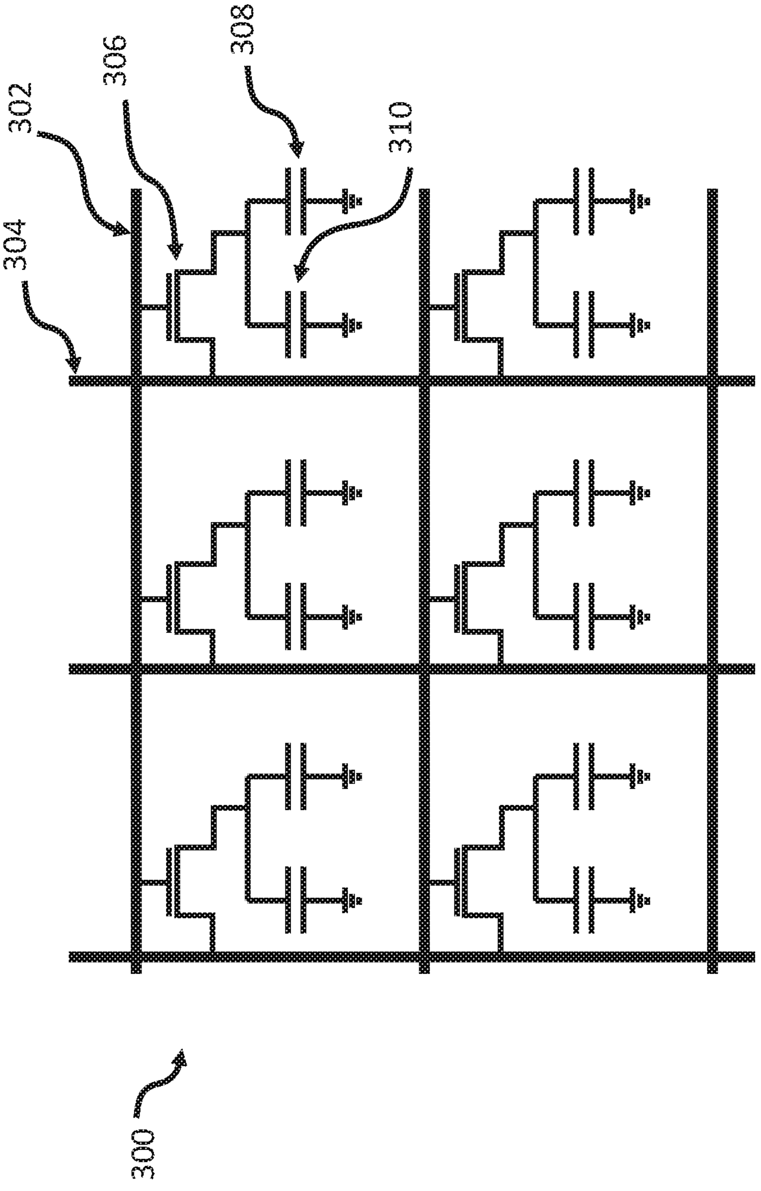
FIG. 3A is a schematic electronic diagram of an array of pixels which are addressed by a thin film transistor (TFT) array.

FIG. 3A is a schematic electronic diagram of an array of pixels which are addressed by a thin film transistor (TFT) array 300. In this example, the horizontal conductive traces are referred to as select lines 302 and the vertical conductive traces are called data lines 304. The select lines are connected to the gate terminals of thin film transistors 306, and the data lines are connected to the source terminals of the thin film transistors. When a voltage is applied to the select line, the channels of the thin film transistors connected to that select line become conductive. When the channels of the thin film transistors are rendered conductive, voltage signals from the data lines can propagate into the pixel's driven electrode 308. There may also be a storage capacitor 310 in each pixel which may help to maintain the voltage at a constant level for a time, preferably until the pixel is addressed again. When the voltage signals from the data lines are applied to the conductive pad and the storage capacitor, the electric field across the electrophoretic dispersion layer changes which changes its optical characteristics as described in PCT/IB2019/058306. Once the voltage on the select line is set low, the row is no longer being addressed, and the pixel may approximately maintain its voltage until the next time its row is addressed by the select line. In this way, the display controller may cycle through the rows of the display, updating each in turn to build up an image, and change it periodically, every time a cycle is completed.

Figure 3B:
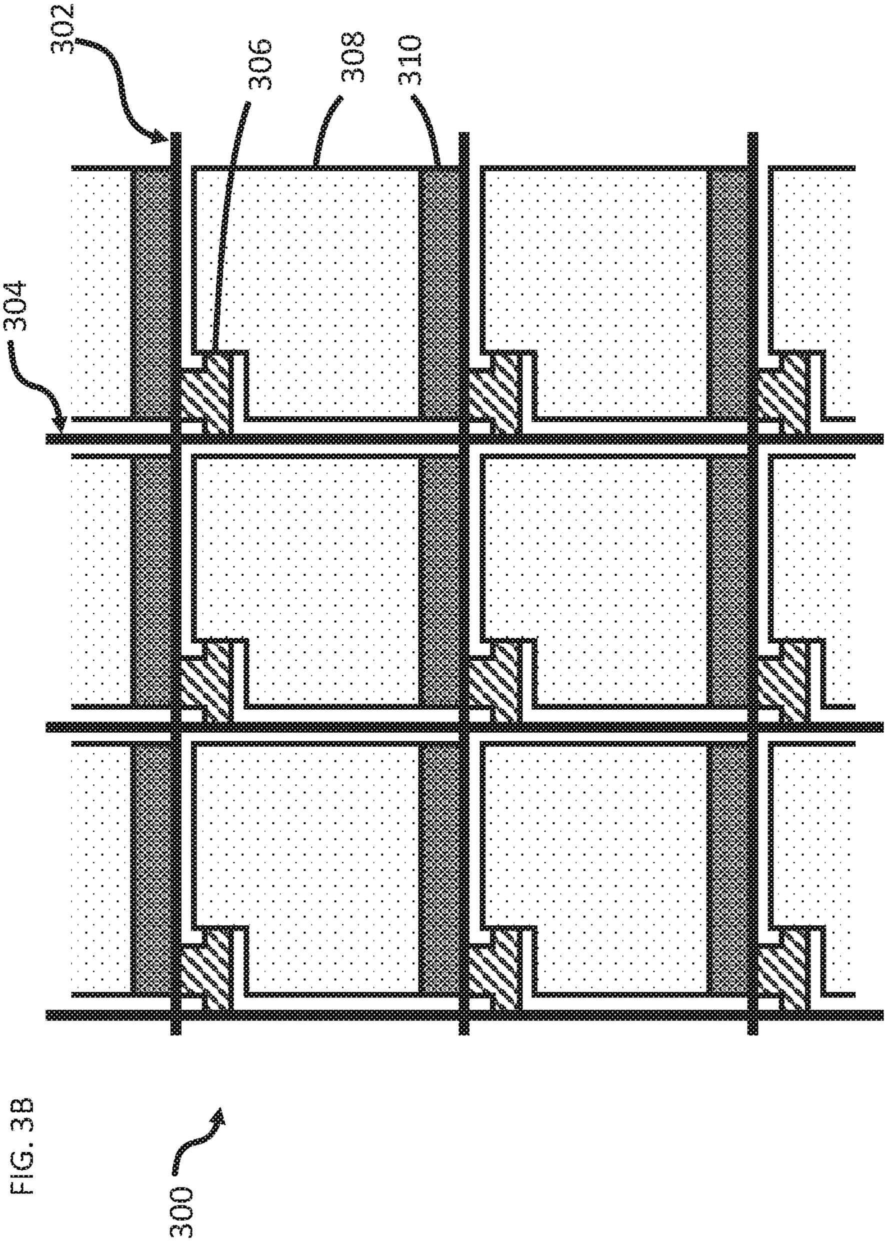
FIG. 3B is a schematic diagram of the approximate physical layout of the components in the TFT array of FIG. 3A.

FIG. 3B is a schematic diagram of the approximate physical layout of the components in the TFT array 300. Because the layers of a multi-layer color changing display are stacked, the pixels in the display may be square, or may be some other shape. The shape is defined by the relative spacing of the select lines 302 and data lines 304, and by the driven electrode 308.

In the present example, the grounded terminal of the storage capacitor 310 is connected to the select line of the adjacent row of pixels. While the select line which drives the storage capacitor's row of pixels is high, the other select lines are low, which allow them to act as a ground for the capacitor. Other arrangements are possible, for example, there may be an additional reference electrode for each row of the display, and the grounded terminal of the storage capacitors in each row may instead be connected to that line.

In some embodiments, the fraction of the total pixel area taken up by the select lines, data lines, thin film transistors and storage capacitors is as small as possible, to maximize the amount of area taken up by the pixel driven electrodes, and thus maximizing the fraction of the display which changes color in response to the applied voltages, improving the contrast and brightness of the display.

In some embodiments, the thin film transistors are made using a transparent semiconductive material such as indium gallium zinc oxide, aluminum doped zinc oxide, or poly(3, 4-ethylenedioxythiophene) polystyrene sulfonate, to reduce the blockage of light by the thin film transistor. In some embodiments the storage capacitor is made using a transparent conductive material to reduce the blockage of the light by the storage capacitor and improve the contrast and brightness of the display.

In some embodiments, there may be additional conductive materials deposited between the data lines and the semiconducting materials of the TFT to reduce the contact resistance of the junction that is formed there.

Figure 4A:
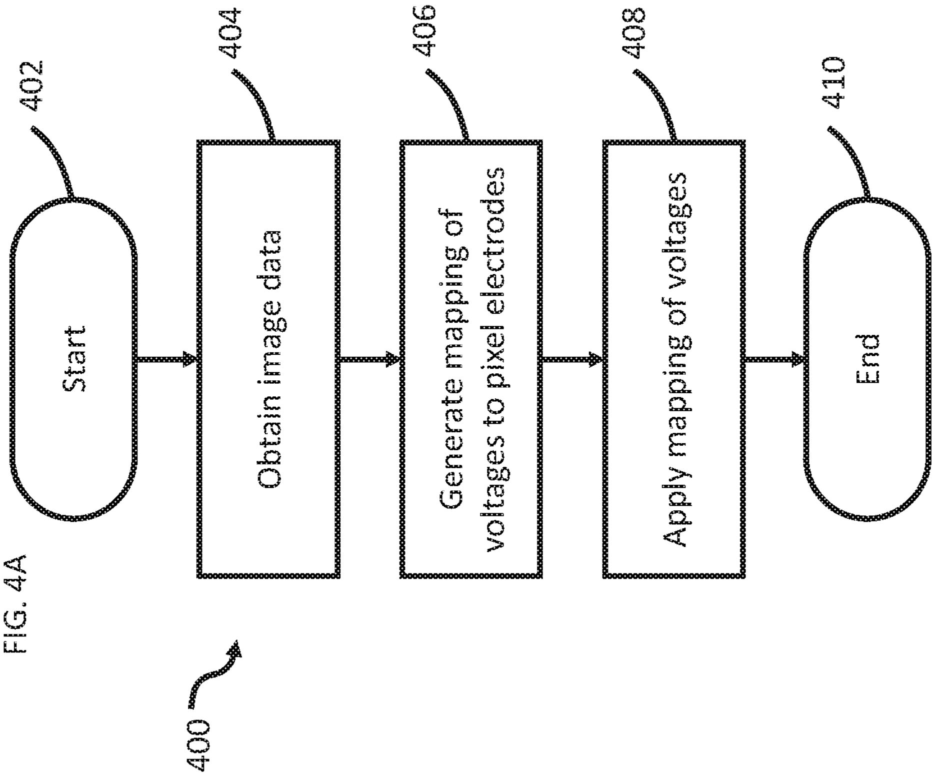
FIG. 4A is a flowchart illustrating an example method of driving display device.

FIG. 4A is a flowchart of an example method 400 of driving the display device.

At block 402, the method 400 is initiated. The method 402 may begin at an update or refresh of an image frame corresponding to an image to be displayed by the display device.

At block 404, image data representing an image to be displayed by the electrophoretic display device is obtained. The image data may map an image to be displayed by the display device to one or more pixels of the display device. In other words, the obtained image data corresponds to at least one pixel of the electrophoretic display device. The image data includes instructions for optical properties to be adopted by pixels of the display device. For example, the image data may include instructions for color and/or degree of saturation or other optical properties of each of the pixels of the display device. As another example, the image data may include instructions for voltages to be applied to electrodes coupled to pixel chambers corresponding to the pixels of the display device to achieve display of the image. Image data may be obtained at a display driver coupled to the electrodes.

At block 406, a mapping of voltages to a subset of the driven electrodes of the electrophoretic display device is generated. The driven electrodes may control pixels (e.g., as defined by chambers or regions of the layer of microstructures containing the electrophoretic media) containing the component chemical entities that exhibit a first optical property when induced by an electromagnetic field to adopt a separated state and that exhibit a second optical property when induced by an electromagnetic field to adopt an active state. In other words, the driven electrodes may control the pixels of the display device. In some examples, the pixels need not be defined by specific chambers or regions, but rather are defined by the shape of each individual driven electrode. That is, each pixel may be defined by the electrophoretic media contained in microstructures aligned with (i.e., above or below) each driven electrode. Advantageously, this may allow for greater flexibility in manufacturing of color-changing layers, since specifically defined chambers need not be incorporated to define the pixels. In other examples, the driven electrodes may correspond to segmented regions (e.g., as depicted in FIG. 2A-2C) containing microstructures with the electrophoretic media.

Accordingly, at block 406, the subset of driven electrodes corresponds to the pixels or regions which map to the image data. The voltage may be applied to each driven electrode in the subset, relative to the reference electrode.

At block 408, the mapping of voltages is applied to the driven electrodes in the subset of driven electrodes selected at block 406 to cause the component chemical entities to adopt the separated state or the active state. The mapping of voltages may be applied to one or more driven electrodes. In other words, a voltage is applied to at least one driven electrode. Application of the voltage results in adjustment of an electromagnetic field passing through one or more pixel or region defined by (i.e., aligned with) the corresponding driven electrode. The applied voltage may substantially generate the electromagnetic field, substantially eliminate the electromagnetic field, increase the strength of the electromagnetic field, or decrease the strength of the electromagnetic field.

Further, adjustment of the electromagnetic field results in states of chemical entities the region aligned with the driven electrode being switched. The states of the chemical entities may be altered between separated and optically active states, or vice versa, as discussed herein. As such, adjustment of the electromagnetic field may cause chemical entities to separate, thereby adopting a separated state, or to come into close proximity, thereby adopting an optically active state.

Further still, altering the state of chemical entities results in one or more pixels exhibiting an optical property corresponding to the image data. Thus, an optical property, such as color, contrast, or degree of saturation, of one or more regions of the display may be changed. Thus, application of the voltage results in adjustment of an electromagnetic field passing through the region, switching of states of chemical entities in the pixel; and exhibition by the region of an optical property corresponding to the image data.

At block 410 the method is ended. However, it is to be understood that any of the blocks of the method 400 may be repeated as necessary for the display of an image or video on the display device.

Figure 4B:
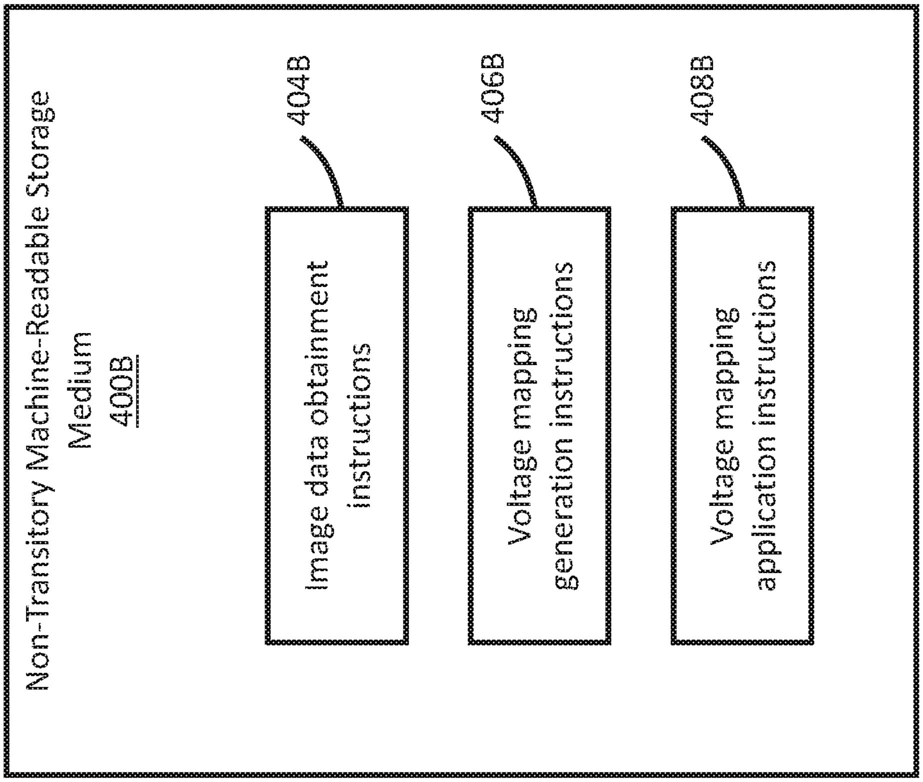
FIG. 4B is a schematic diagram illustrating an example non-transitory machine-readable storage medium containing instructions for controlling an electrophoretic display device.

FIG. 4B is a schematic diagram of an example non-transitory machine-readable storage medium 400B containing instructions to control an electrophoretic display device. The instructions are executable by one or more processors of a computing device. The computing device may include an electrophoretic display as discussed herein.

The storage medium 400B includes image data obtainment instructions 404B to obtain image data representing an image to be displayed by the electrophoretic display device.

The storage medium 400B further includes voltage mapping generation instructions 406B to generate a mapping of voltages to pixel electrodes of the electrophoretic display device. The pixel electrodes are to control pixels containing component chemical entities that exhibit a first optical property when induced by an electromagnetic field to adopt a separated state and that exhibit a second optical property when induced by an electromagnetic field to adopt an active state, as discussed herein.

The storage medium 400B further includes voltage mapping application instructions 408B to apply the mapping of voltages to the pixel electrodes to cause the component chemical entities to adopt the separated state or the active state.

Thus, an electrophoretic device may be controlled to display images or video as discussed herein.

Figure 5B:
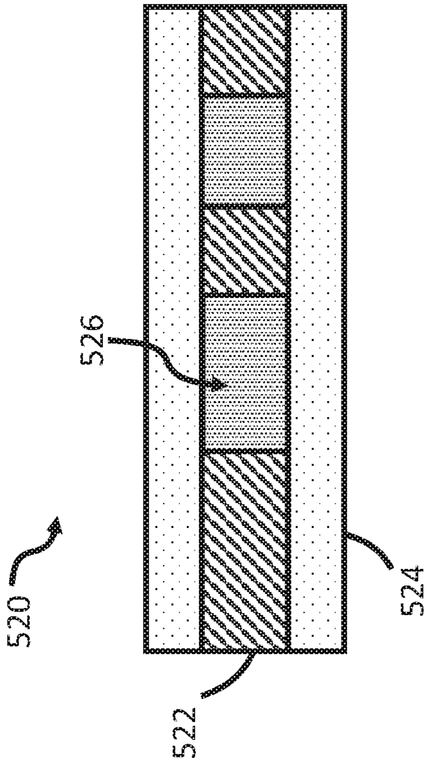
FIG. 5B is a schematic cross-sectional diagram of an example display device formed using the method of FIG. 5A.
Figure 5A:
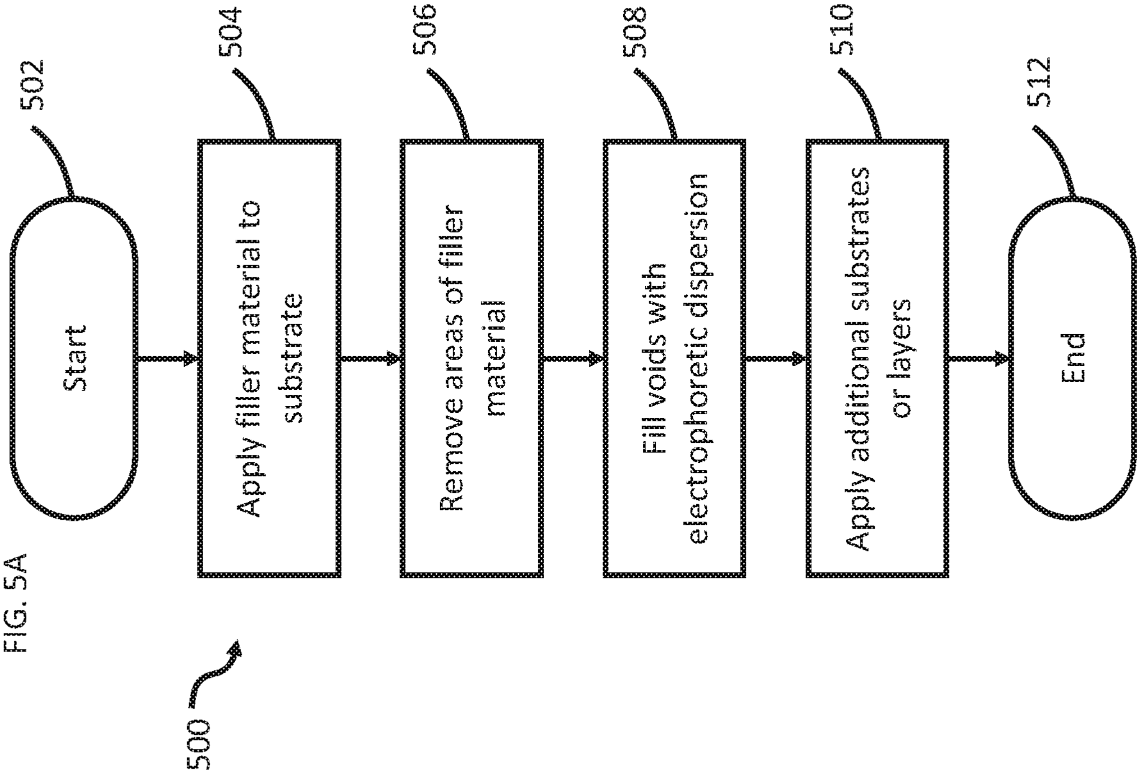
FIG. 5A is a flowchart illustrating an example method of preventing color formation in selected areas of a display device.

FIG. 5A is a flow chart of an example method 500 of preventing color formation in some areas of the display. At block 502, the method 500 is begun. A substrate is provided which may have electronics, dielectric barriers and other layers as disclosed herein. At block 504, a filler material is deposited onto the substrate, in a thickness that matches that of the desired thickness of the electrophoretic dispersion layer. This may be achieved by spin coating, by spray deposition, by doctor blade application, by slot-die coating, or other methods which occurs to those skilled in the art. At block 506, select areas of the filler material are removed leaving voids. This may be achieved by imprint lithography, photolithography followed by subsequent wet or dry etching steps. It may also be achieved by liftoff lithography depending on the layer thickness and method of application of the layer, which might involve applying a template negative to the substrate, applying the filler material, and removing the negative. It may also be achieved by another method which directly lays out the pattern such as screen printing or inkjet deposition, or other methods. Alternatively, prefabricated pieces of filler material may be directly laid down and adhered to the substrate. At block 508, the voids are filled with electrophoretic dispersion. At block 510, additional layers or patterned substrates may be applied to contain the electrophoretic dispersion, such as capacitive touch layers, light reflecting layers, light scattering layers, light absorbing layers, patterned transparent or opaque conductive substrates, or other layers as discussed herein. Additionally, more color-changing layers may be added as well, each with associated driving and reference electrodes in order to fabricate a device which can exhibit more complex light absorption patterns, including layered shapes as well as additional colors.

FIG. 5B is a schematic diagram of an example of a cross section of the display 520 after performance of the method 500. Method 500 may be performed when there are areas of the display where no color change is desired (i.e., designated static regions of the display). An example device which may benefit from the performance of method 500 is a 7-segment display, which displays digits by toggling the visibility of seven segments per digit, such as the displays commonly seen on digital watches, clocks and calculators. Other examples include signage such as over a doorway or on the exterior of a vehicle which may only need to display a small range of possible images by toggling the visibility of the appropriate segments. A filler material 522 such as a polymer resin may be applied to a substrate 524 in the performance of block 504, and then the filler material may be patterned so that some areas are removed from the substrate while others remain. The electrophoretic dispersion and associated microstructures 526 may be applied in the regions where the filler material was removed. Other materials are contemplated for the filler material, such as glass, and even opaque materials such as metals, opaque polymers, or metals, as examples, so long as the material can be patterned and produced in a layer as thick as the electrophoretic dispersion is.

In examples where the microstructures are of a non-fluid type and cannot be filled into voids, appropriate methods may be used during the microstructure fabrication process so that the display includes some un-patterned regions so that the electrophoretic dispersion cannot be filled into those un-patterned regions, or appropriate steps may be taken so that the electrophoretic dispersion is not filled into some areas as desired. That is, the un-patterned regions and areas which are unfilled by the electrophoretic dispersion will not yield a change in color when an electric field is applied, thus preventing color formations in those regions or areas.

Figure 6A:
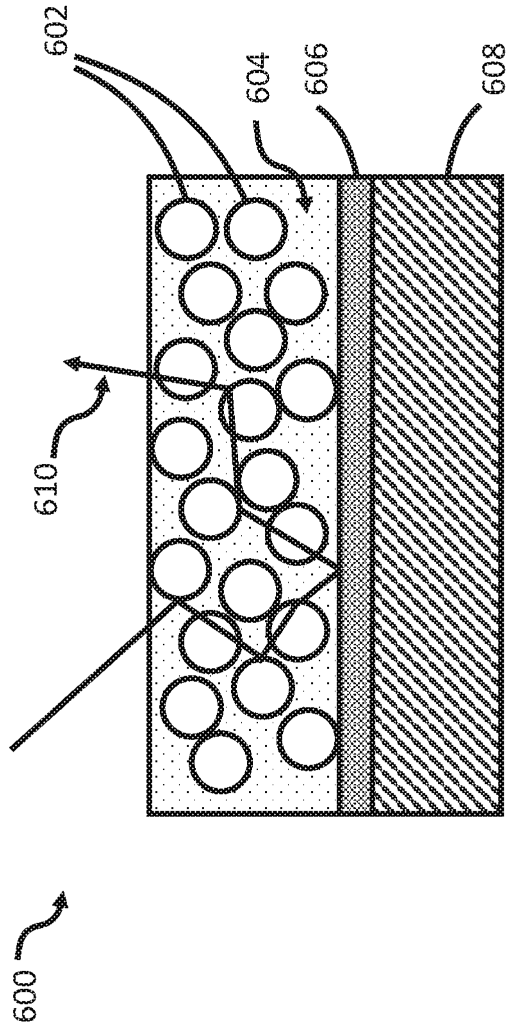
FIG. 6A is a schematic diagram of an example reflective scattering layer.

FIG. 6A is a schematic diagram of an example highly reflective white scattering layer 600 which may be used, for example, as the light reflecting layer 116 of the display device 100 of the present disclosure. This may be useful on a mobile device, especially a device made to read text from, and which may be more comfortable to read from than an emissive display. This may include the displays of cellphones, tablets, laptops, e-readers and other portable electronic devices which commonly feature displays. It may also be useful for devices designed to display digital artworks, because the approximately Lambertian reflection profile may make the artwork appear more natural, like a physical poster or painting, rather than an image displayed on an emissive screen. The scattering layer 600 comprises a plurality of particles 602 of a material of high refractive index, preferably a refractive index in visible wavelengths above about 2.0, such as titanium dioxide or zirconia. These particles may have a diameter similar to the wavelength of light, preferably below about 1 micrometer and most preferably a diameter of about 280 nanometers. These particles may be embedded in a low refractive index matrix layer 604, made of a material such as a polymer resin, preferably a refractive index in visible wavelengths below about 1.45. This scattering layer may be applied to a reflective layer 606 such as aluminized mylar film, or a metallic film, or other reflective structure to enhance the reflectivity of the scattering layer. In some examples the reflective layer 606 may in turn be disposed onto a substrate 608 to provide structural support. 610 is an example of a path a light ray incident on the scattering layer may take through the layer, illustrating that the direction of the light ray may change multiple times as it travels through the layer. The matrix layer 604 is preferably between about 10 microns and about 250 microns in thickness. The thickness of the matrix layer 604 is preferably not so thick that a significant proportion of the light which is incident on the matrix layer 604 is lost within the matrix layer 604. The thickness of the matrix layer 604 is preferably not so thick that the mean lateral scattering distance within the matrix layer 604 exceeds about 50 microns, and more preferably the mean lateral scattering distance is less than 25 microns. The thickness of the matrix layer 604 is preferably not so thin that the reflective layer 606 underneath contributes some specular reflection to the scattering layer 600, but instead, the angle of reflection of an outgoing light ray has little correlation with the original angle of incidence. Preferably the outgoing light has an intensity distribution substantially similar to a Lambertian reflector, so that the surface appears approximately uniform in brightness when viewed from any angle under a uniform illuminance. This is a quality of the aforementioned scattering layer, dependent on the refractive index and size of the dispersed particles and the refractive index of the matrix layer.

In some examples, the particles 602 or the matrix layer 604 include fluorophores or dyes which subtly alter the reflection spectrum of the display. This may be preferable when the display stack includes color changing layers that do not uniformly absorb white light at maximum intensity, but instead let some wavelengths pass through more intensely than others. This can degrade the contrast of the display as well as the color reproduction of the display. By including such spectrum-altering components in the scattering layer 600, the display may achieve better contrast and color reproduction. This may be achieved by subtracting out wavelengths from the transmission spectrum of the device in the dark state which the color-changing layers do not sufficiently absorb for the desired application. However, the addition of these spectrum-altering components must be optimized so as not to degrade the appearance of the device in the light state.

In other examples, the scattering layer may include organic or inorganic fluorescent materials which absorb high energy wavelengths of light and re-emit visible wavelengths of light to improve the apparent brightness or whiteness of the display.

Figure 6B:
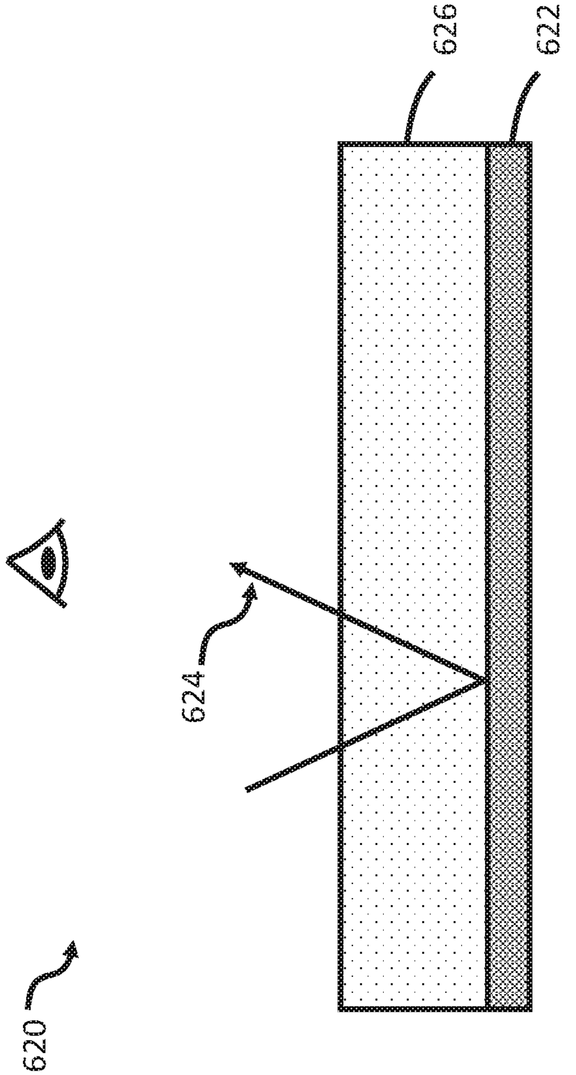

FIG. 6B is a schematic diagram of a display device 620 with a reflective layer 622 that exhibits purely specular reflection, such that the angle of incidence of an incoming light ray 624 is substantially equal to the angle of reflection of that light ray as it leaves the display. This would give the display a mirror-like quality, but with the ability to modulate the color of the light reflected from the surface from different parts of the display at different times, owing to a color-changing layer 626. For example, the color-changing layer 626 may be one or more of the color-changing layers 122 of FIG. 1. This may be useful on a device which is meant to appear to be an ordinary mirror when off or not in use, but be able to display information or images as desired. This may be useful as a heads-up display in a home, or as an indicator on the mirrors of an automobile to alert the driver to traffic conditions such as another car in the vehicle's blind spots.

Figure 7B:
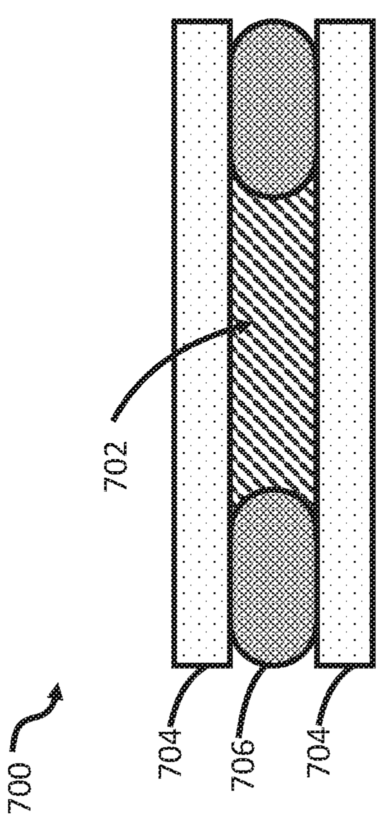
FIG. 7B is a schematic cross-sectional diagram of the display device of FIG. 7A.
Figure 7A:
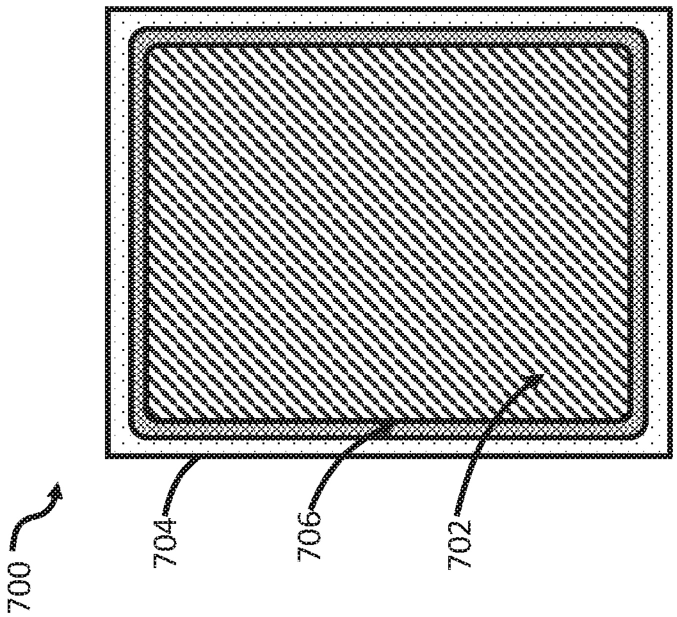
FIG. 7A is a schematic diagram of an example display device in which electrophoretic dispersion and microstructures are contained by substrates and a sealant material.

FIG. 7A is a schematic diagram of an example display device 700 where the electrophoretic dispersion and microstructures 702 is contained within the display device by substrates 704 and sealant material 706. The sealant material may be chosen to prevent the migration of any component of the electrophoretic dispersion out of the display, as well as to be insoluble and robust against any component of the electrophoretic dispersion. It may also be preferable that the sealant material prevents the diffusion of atmospheric gases, water, debris, or other material into the display. As described elsewhere in this disclosure, the substrates may include several other layers for other purposes other than just containment of electrophoretic dispersion and microstructures.

FIG. 7B is a schematic diagram of the cross section of the display device 700 comprising electrophoretic dispersion and microstructures 702, substrates 704, and sealant material 706 of FIG. 7A.

Figure 8:
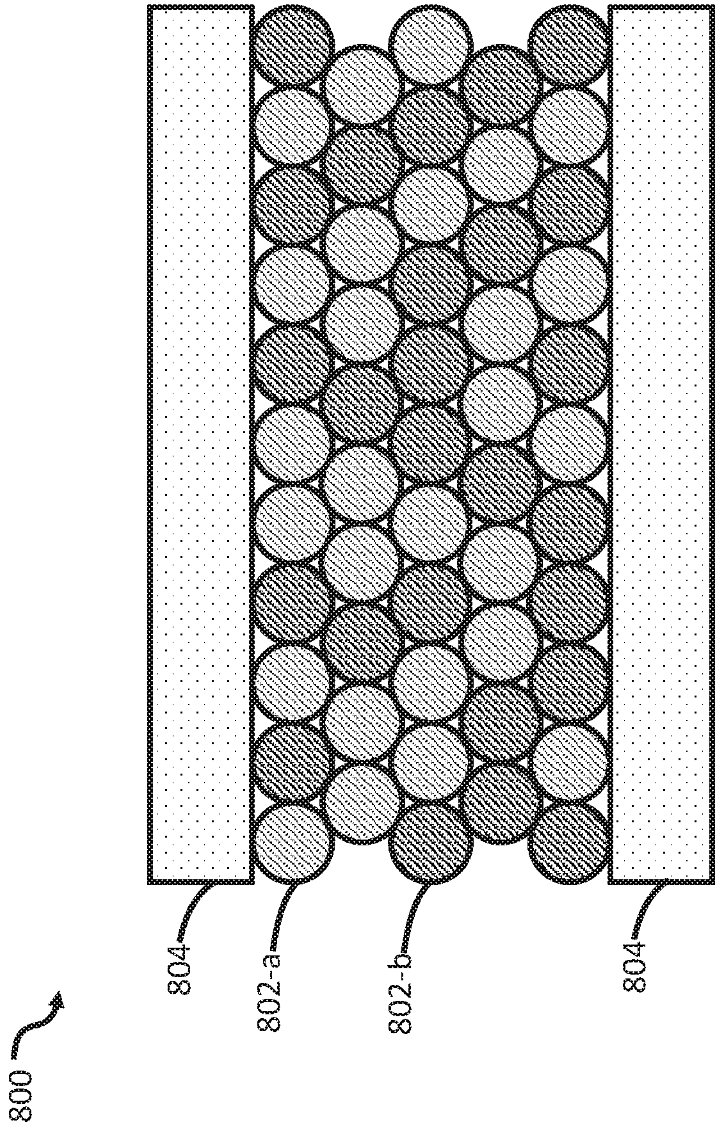
FIG. 8 is a schematic cross-sectional diagram of an example display device having microstructures containing different types of electrophoretic dispersions.

FIG. 8 is a schematic diagram of the cross section of an example display device 800, wherein microstructures 802 containing two different types of electrophoretic dispersions are provided between substrates 804. As described elsewhere in this disclosure, the substrates may include several other layers for other purposes other than just containment of electrophoretic dispersion and microstructures.

Such a mixing of electrophoretic dispersions may be preferable, for example, to achieve a change in an optical characteristic such as absorption which is a linear combination of the change produced from each electrophoretic dispersions. Such an effect may be difficult to achieve with a single electrophoretic dispersion, hence why it is beneficial in some examples to mix two or more dispersions into one layer.

Figure 9A:
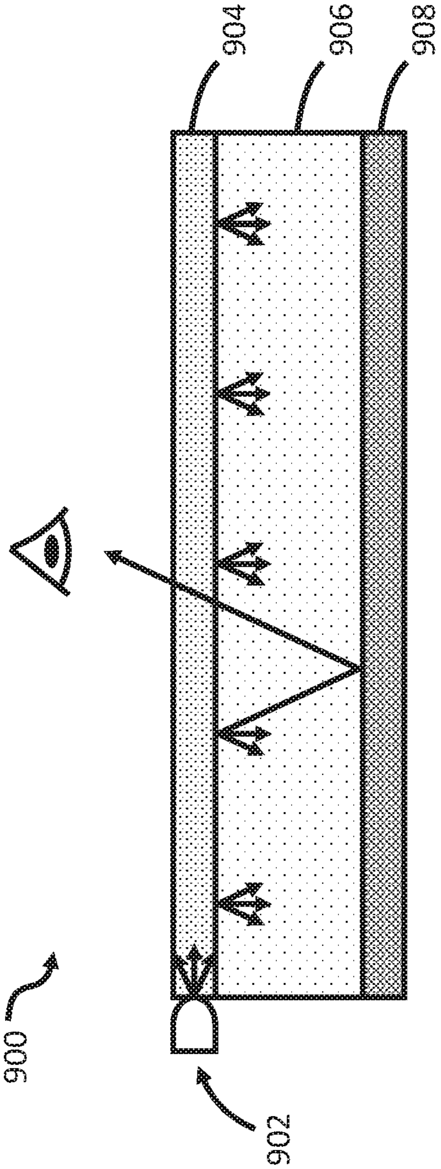
FIG. 9A is a schematic diagram of an example front-lit display device.

FIG. 9A is a schematic diagram of an example display device 900 which utilizes a light source 902 and one or more light-guiding and scattering layers 904 which scatters light (i.e., along its length and/or area) and emits the scattered light into a display stack 906. In particular, the light emitted into the display stack 906 may be substantially evenly scattered across the area of the layers. The light then reflects off of the light reflecting layer 908, some of which may then travel through the display stack 906 again in the opposite direction and leave the display device 900. The display stack 906 may be, for example, the display stack 100, the display stack 120, or other suitable display stacks with color-changing layers containing an electrophoretic dispersion to allow the display device 900 to display colors. In some examples, a front light layer, such as the front light layer 904, may be preferable to a back-light layer in order to improve the color contrast of the display device 900, as two passes through the colored layers of the display stack 906 will enhance the absorption of the unwanted wavelengths of light.

In one example, the light source 902 is a trichromatic light source, such as a trichromatic phosphorescent white LED, a trichromatic white quantum dot LED, or other light source which produces narrow peaks in the red, green and blue regions of the spectrum. In this example, the display stack used preferably has cyan, magenta and yellow color absorption layers. In other examples, the layers may be combined into one layer to achieve a black and white display. In other examples, the LED may emit colored light, which may be preferable depending on the application of the display device.

Figure 9B:
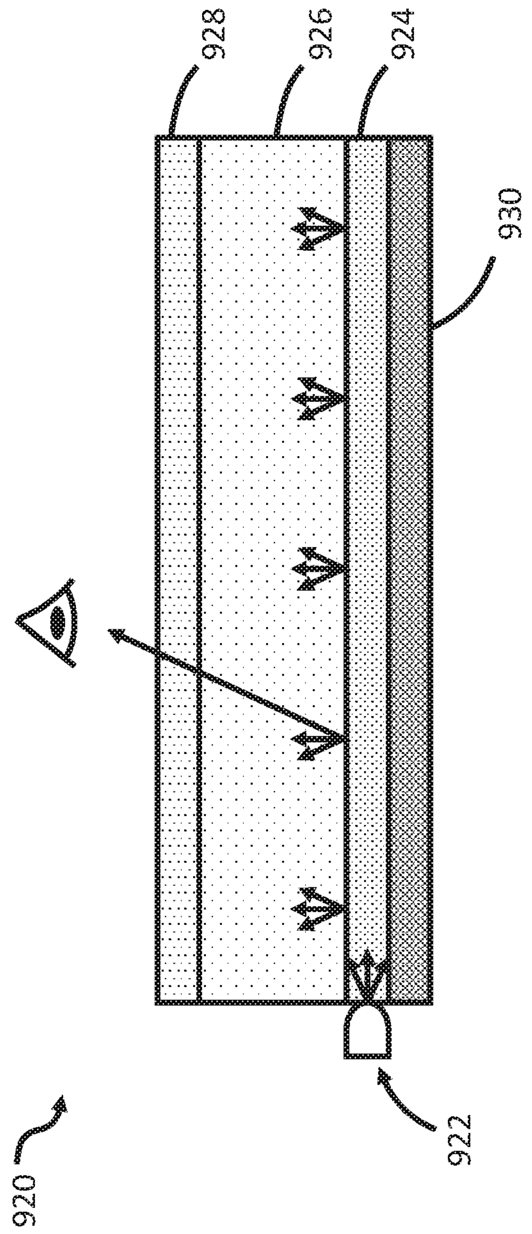
FIG. 9B is a schematic diagram of an example back-lit display device.

FIG. 9B is a schematic diagram of an example display device 920 which utilizes a light source 922 and one or more light-guiding and scattering layers 924 which scatters light (i.e., along its length and/or area) and emits the scattered light through the display stack 926. In particular, the light emitted into the display stack 926 may be substantially evenly scattered across the area of the layers. The light then exits the display device through a front substrate 928. With a back light layer rather than a front light layer, the emitted light only makes one pass through the display stack 926, and thus may achieve less contrast. However, a back light layer may be preferable, especially in the case where the whole display stack 926 is partially or completely transparent. In one example, the display device 920 may be mounted onto a transparent surface, for example a window. The display device 920 could thus be used during the daylight hours when there is sufficient light passing through the window, as well as during the night when there is not enough ambient light, the back light could provide sufficient light to be able to use the display device.

In some embodiments of the display device 920, there may be additional layers 930 adjacent to the back light layer. In one example the additional layers are light reflecting layers which ensure that a larger portion of the light emitted by the light source leaves the front of the display towards the viewer.

Figure 10:
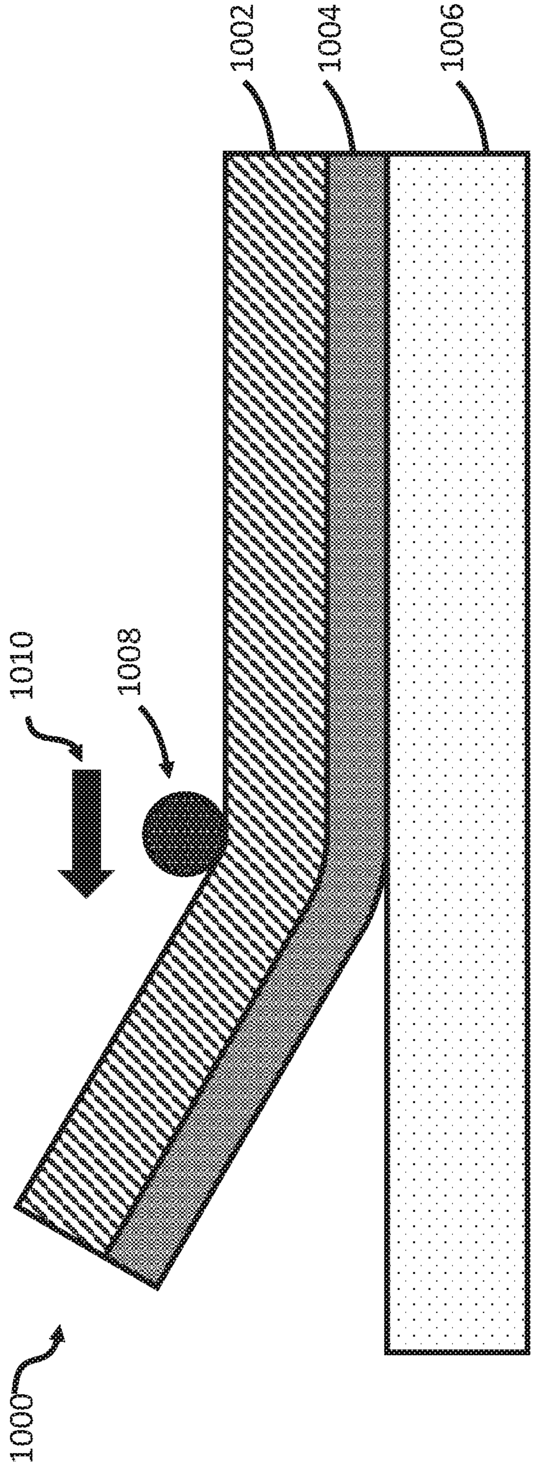
FIG. 10 is a schematic diagram of an example laminated display device during a manufacturing process.

FIG. 10 is schematic diagram of a laminated display device 1000 during a manufacturing process, in which a flexible single layer display stack 1002 and an optional adhesive layer 1004 is pressed onto a driven electrode substrate 1006 by a lamination device 1008. The lamination device presses the laminate onto the substrate along direction 1010. Such a display device may be preferable where the shape of the device is not rectangular, as the laminate may be cut to form various shapes. Lamination device may apply pressure or heat as appropriate to ensure the laminate sticks to the driven electrode substrate.

In some examples, display stack 1002 includes a reference electrode on a flexible substrate but does not include driven electrodes as this role is fulfilled by driven electrode substrate 1006. In other examples a reference electrode layer is further laminated on top of the display stack.

In some examples, the driven electrode substrate may be a TFT array patterned onto a substrate.

In some examples, the driven electrode substrate may also be flexible, so that the whole laminated display device is flexible.

In some examples, additional layers may be added to either side of the laminated display device, such as a capacitive touch panel, protective layers, or other layers as described elsewhere in this disclosure.

Figure 11:
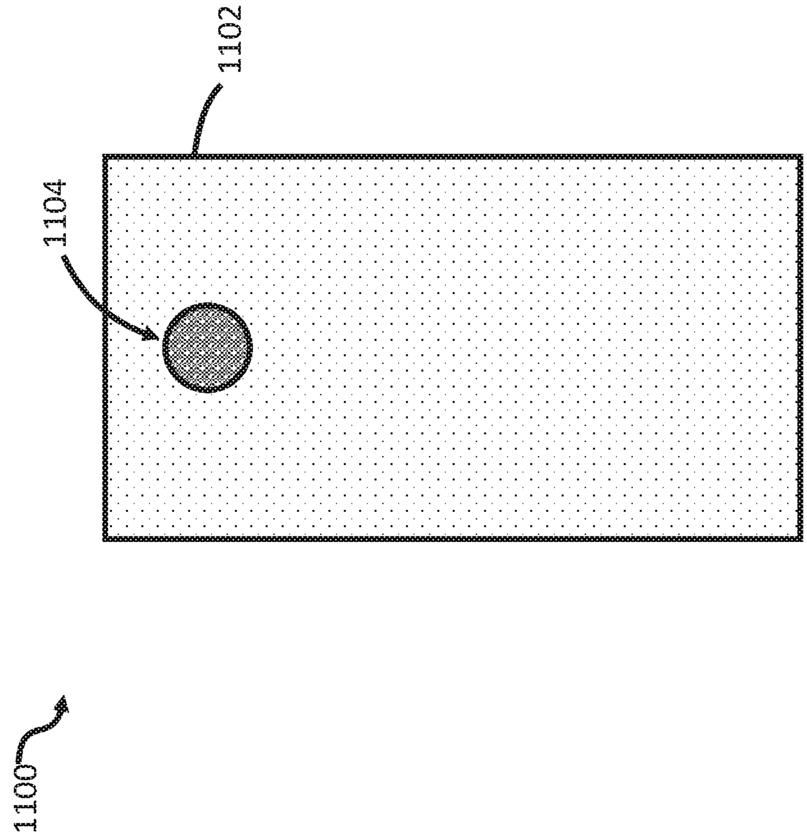
FIG. 11 is a schematic diagram of an example light-reflecting layer comprising a reflective scattering layer and a polymer-dispersed liquid-crystal device.

FIG. 11 is a schematic diagram of an example light reflecting layer 1100, which comprises a white reflective scattering layer 1102 and a PDLC device 1104. The scattering layer 1102 has a section cut out to provide space for the PDLC device 1104. The PDLC device can switch between substantially transparent and substantially opaque and reflective, so that the light reflecting layer may optionally be made transparent in one spot. This may be preferable in an application of the present disclosure where a camera device is located behind the display device. When the PDLC is in its opaque state, the camera device may not be visible and the whole area may be used to view the display device. When the PDLC is in its transparent state, the camera device may be visible, and may be used to take a photograph or video.

Figure 12:
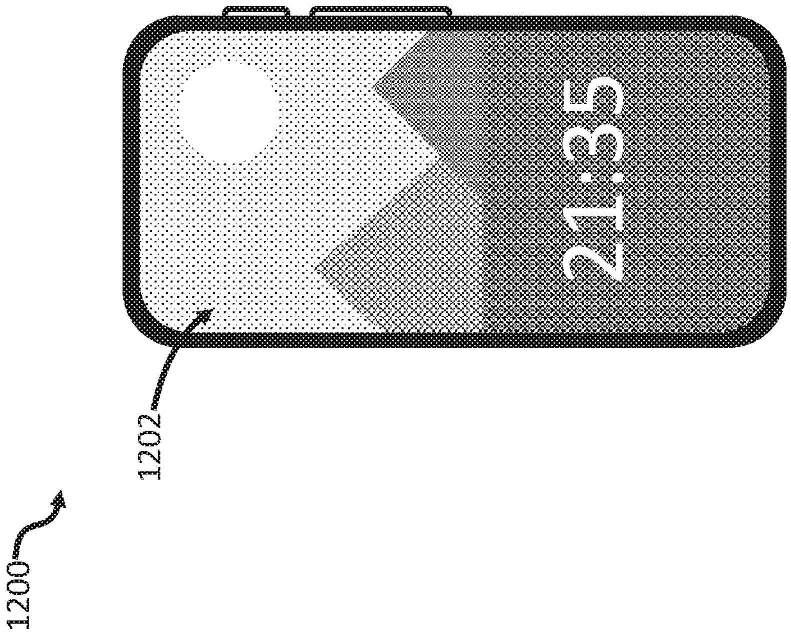
FIG. 12 is a schematic diagram of an example mobile device comprising an electrophoretic display device.

FIG. 12 is a schematic diagram of an example mobile device 1200 which comprises an electrophoretic display device 1202, which may be one of the display devices described in the present disclosure. In particular, the electrophoretic display device 1202 may include a light reflecting layer exhibiting a Lambertian reflection profile to allow viewers to view the display while reducing eyestrain as compared to typical emissive displays. In some examples, the electrophoretic display device 1202 may include the light reflecting layer 1100, for example to accommodate a front-facing camera of a cell phone or the like. Many types of devices may make use of the display device of the present disclosure, especially mobile devices as in this example. Examples of such applications include smartphones, tablets, e-readers, laptops, and notebooks. E-readers in particular may benefit from a single-color display stack added to them, as a highlighter layer for example. In particular, the electrophoretic display device 1202 may be transparent to allow it to be layered onto other display technologies or other substrates, while allowing the capability to produce colors. Wearables may also make use of the display device, such as smart watches, augmented-reality visors, heart rate monitors. Applications where a power cable is not available during some of the device's lifetime may particularly benefit from this display device, because of the low power benefits offered by this display device and reflective technologies in general.

Other devices may also make use of the display device of the present disclosure. More examples are given below, but in general, the display device can be used in any application where a device is meant to interact with a user in some way, whether directly or indirectly, including existing devices where other display technologies are currently used. However, the display device of the present disclosure permits the creation of entirely new devices based on some of its differentiating features such as transparency, high color quality, daylight visibility and video capability.

Figure 13:
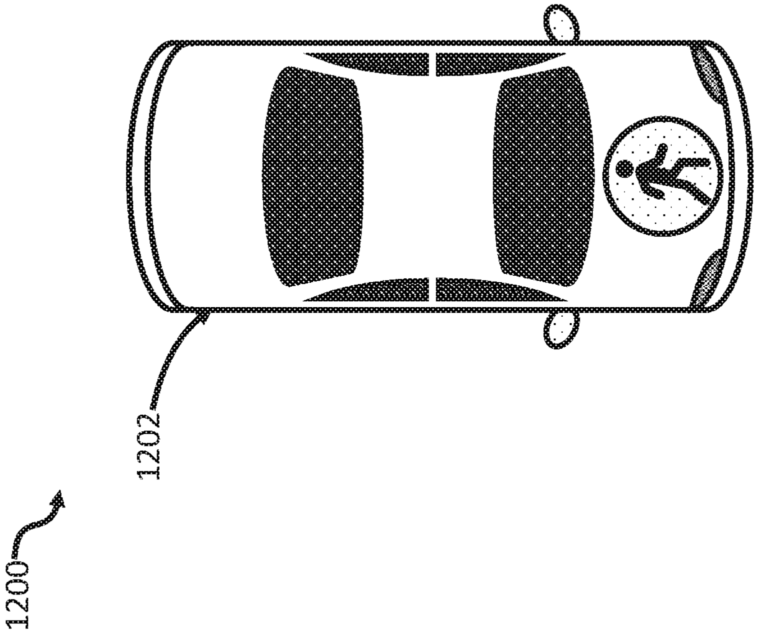
FIG. 13 is a schematic diagram of an example display device disposed on the exterior of a vehicle.

FIG. 13 is a schematic diagram of an example of the display device being used on the exterior of a vehicle 1300. In this example, the vehicle has self-driving capability and does not need a human to pilot it. In this example the display device 1302 informs pedestrians that the self-driving vehicle is aware of their presence and will not collide with them as they cross the road.

In other examples, display devices may be used in many outdoor situations, such as stationary informational signage and sign-based advertising. The display may be applied to other vehicles as well for signage and advertising purposes. To improve visibility and clarity of the display device 1302, in particular in bright, outdoor conditions, the display device 1302 may include a light transformation layer including a light reflecting layer, as well as a light source and a light scattering layer located at the outer substrate (i.e., at a front of the display). Additionally, the light reflecting layer may include a scattering layer with organic or inorganic fluorescent materials which absorb high energy wavelengths of light and re-emit visible wavelengths of light to improve the brightness of the display device 1302.

Figure 14:
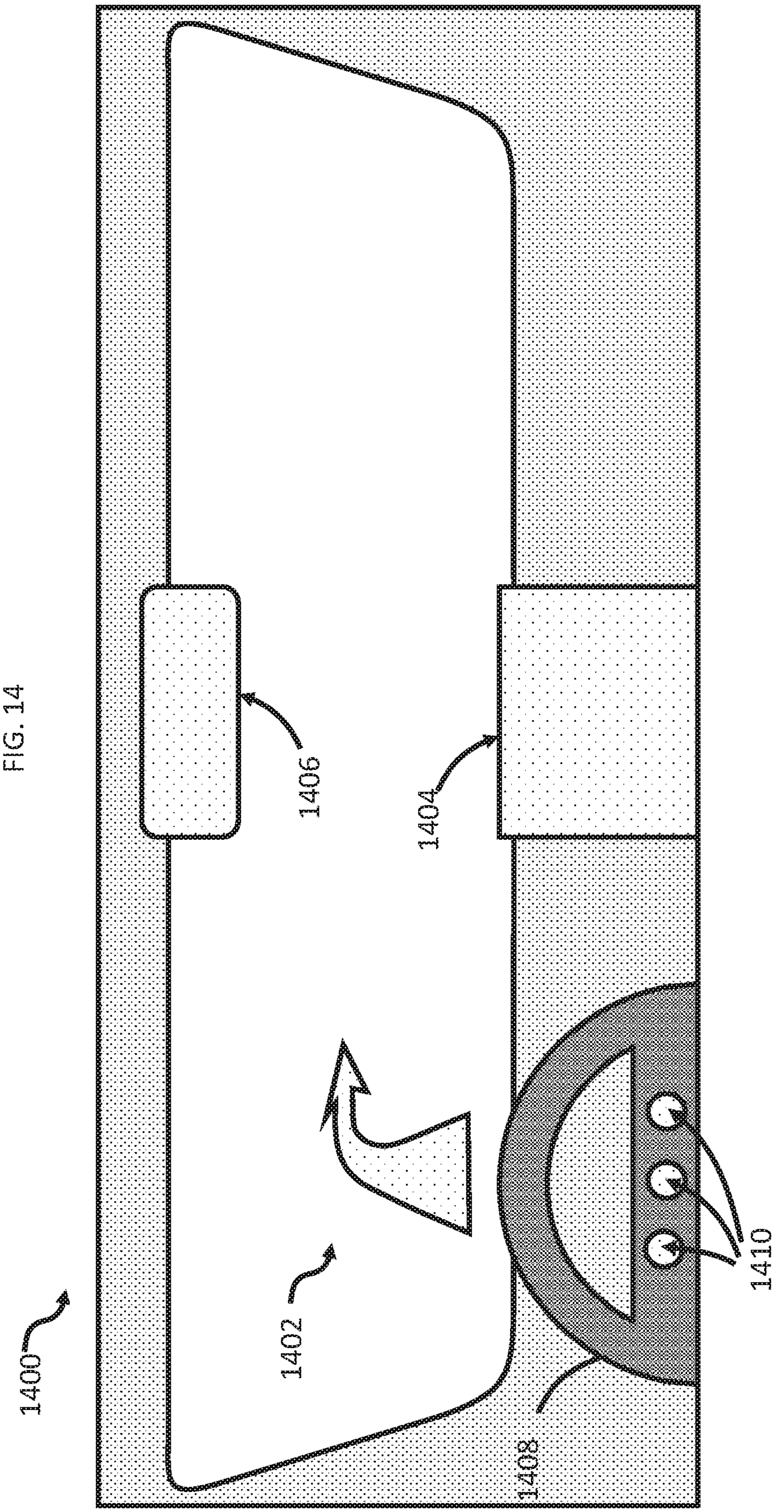
FIG. 14 is a schematic diagram of example applications of display devices within the interior of a vehicle.

FIG. 14 is a schematic diagram of an example application of the interior of a vehicle 1400 where the display device is being used as a heads up display 1402 to provide the driver with directions, visual cues of vehicle speed or alert the driver to changing situations or road conditions. The display device may also be used in the main console unit 1404 used to control the settings of the vehicle and provide an interaction mechanism between the vehicle and its passengers, as well as in the rearview mirror 1406, which can be switched between an ordinary mirror and a video feed from different angles around the car, or other content. Steering wheel 1408 may also have secondary controls 1410 such as dials, buttons and knobs which may feature color changing surfaces or displays comprising the display device of the present invention. Other passengers in the car could also interact with built-in displays within the vehicle for productivity or entertainment purposes. The side and rear windows and sunroof may have the ability to vary their transmissivity again owing to the display device of the present invention.

The various displays in the vehicle 1400 may use various applications of the display devices described herein. For example, the display devices on the console unit 1404 or on the steering wheel 1408 may include a light reflecting layer having a substantially Lambertian reflective profile to reduce eyestrain when interacting with elements within the vehicle. The heads-up display 1402 may have inner and outer substrates, driven and reference electrodes, and any included light transformation layer which are substantially transparent to allow light to be transmitted therethrough. In some examples, the light transformation layer of the heads-up display 1402 may be a light scattering layer which is configured to receive light from a light source to enable the heads-up display 1402 to be utilized when in dark conditions. The rearview mirror 1406 may include an electrophoretic display device with a light reflecting layer exhibiting purely specular reflection to enable the reflective properties of the mirror 1406 to be maintained during ordinary use of the vehicle 1400, while allowing for built-in displays to provide additional information to the driver of the vehicle 1400.

Other vehicles may also benefit from the usage of the display device of the present disclosure. For example, nautical applications or aeronautical applications could benefit greatly from the display's improved daylight visibility due to the interference from bright sunlight that current displays in these applications must face.

Figure 15:
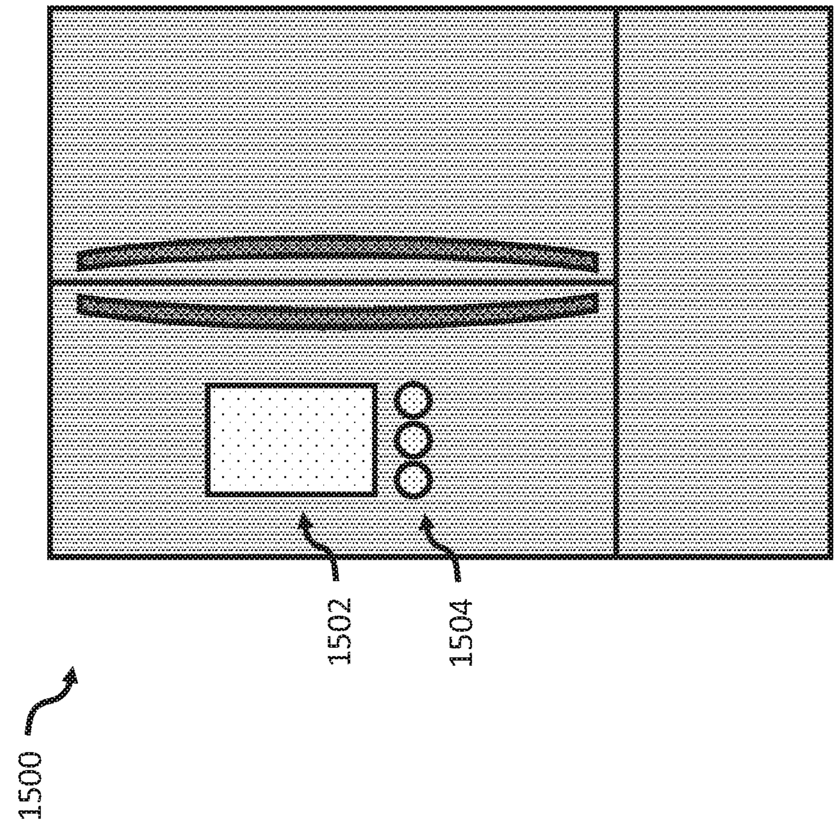
FIG. 15 is a schematic diagram of example applications of display devices in a home appliance.

FIG. 15 is a schematic diagram of an example application of a home appliance 1500 where the display device is being used as the main console unit 1502 for providing an interaction mechanism between the home appliance and the user. Additional display devices may be used in secondary controls 1504 such as buttons, knobs and dials on the appliance. Advantageously, such console units 1502 may reduce power requirements while still allowing the flexibility for a smart appliance and interactions between the home appliance and the user. Additionally, the flexibility of the display may allow it to be applied to existing appliances to achieve a display device on the appliance, rather than requiring more substantial integration into the appliance. Rather, integration may simply be performed by the computing and/or controlling components.

Industrial appliances may also benefit from the display device as an interaction mechanism between the user and the device. This is especially true where the appliances are used outdoors because of the display's improved daylight visibility over some other display technologies (e.g., by adding a light reflecting layer layer).

Figure 16:
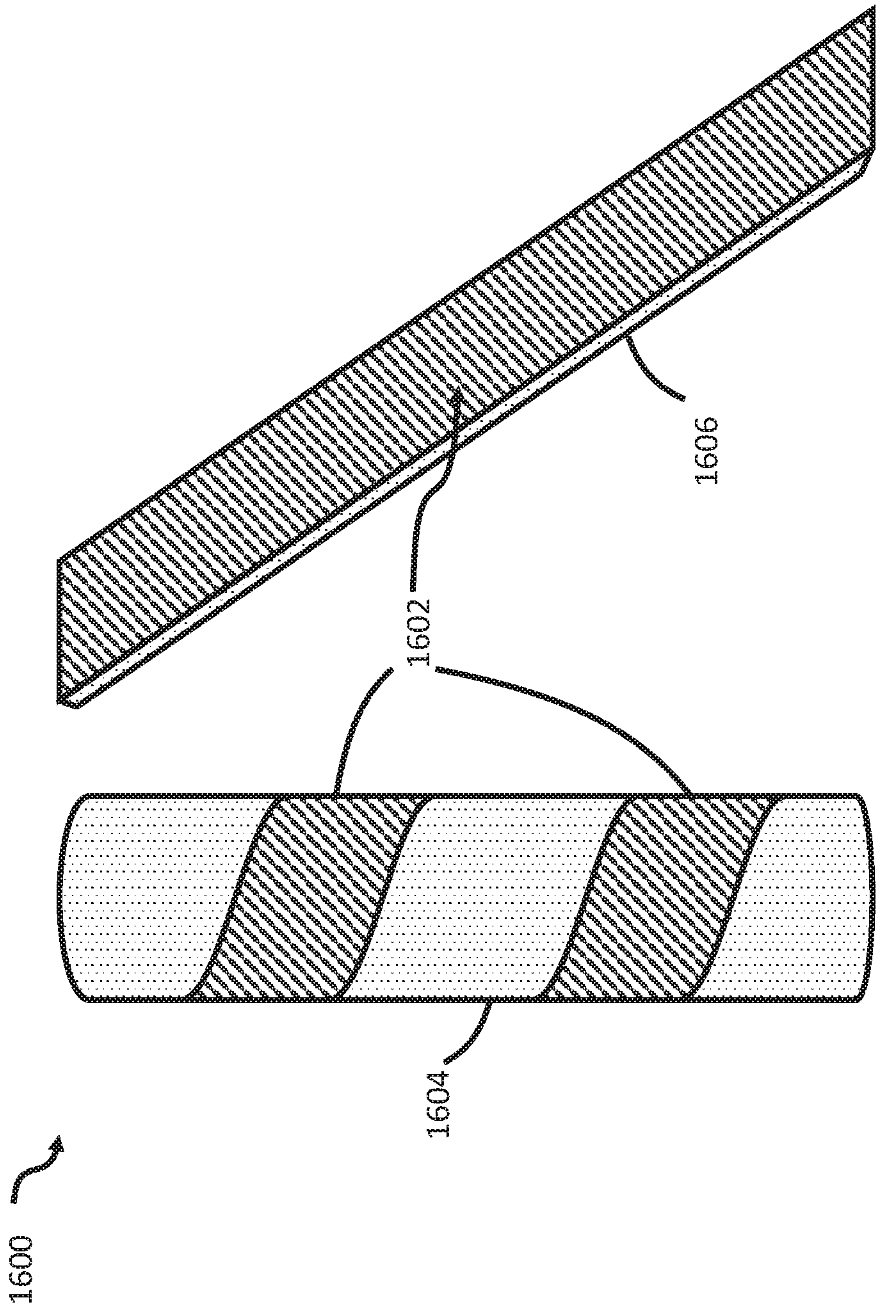
FIG. 16 is a schematic diagram of an example application of a display device on architectural features.

FIG. 16 is a schematic diagram of an example application of architectural features 1600, where the display device is being used in surface accents 1602 on a cylindrical pillar 1604 and a diagonal beam 1606 to augment the aesthetic appeal of the space by providing the surfaces with color-changing or video-displaying abilities. The flexibility of the display thus allows it to be applied to ordinary surfaces to obtain a color-changing surface, or a surface with display capabilities, rather than redesigning architectural components or other objects (as will be apparent) with an integrated display. Additionally, particularly in outdoor applications, power consumption may be reduced since the reflective nature of the display device allows it to leverage ambient light and does not require a light source (i.e., as compared to emissive displays).

Other examples may include color-changing or dimmable windows or sun lights, color changing walls, large screen televisions, and digital art frames.

Figure 17:
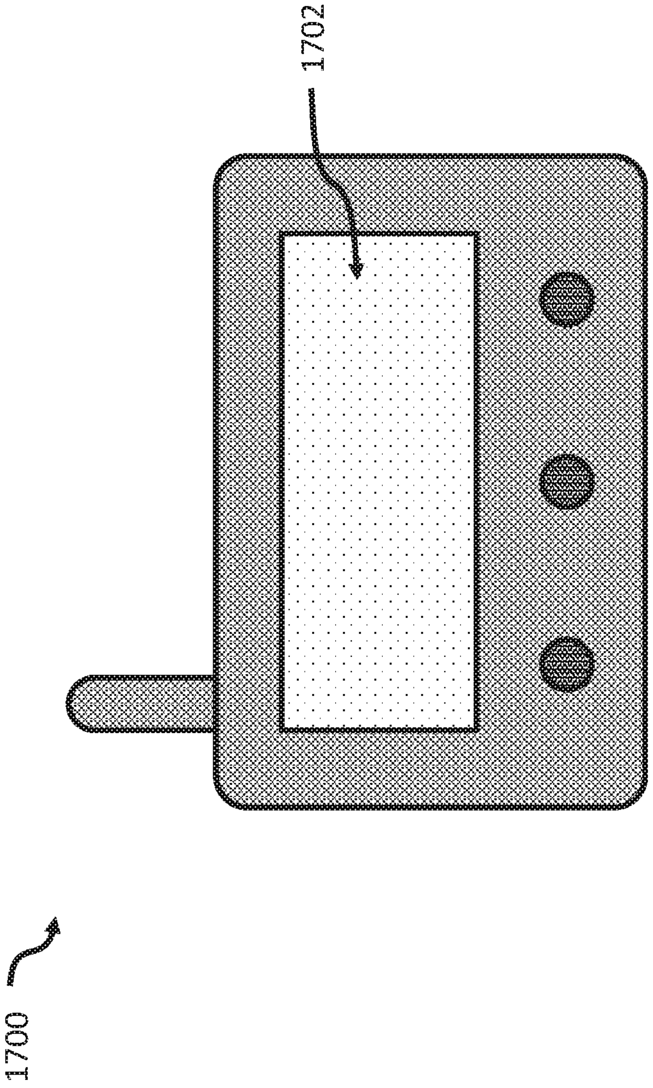
FIG. 17 is a schematic diagram of an example wireless sensor comprising a display device.

FIG. 17 is a schematic diagram of an example application of a wireless sensor 1700 where the display device 1702 is being used as an interaction mechanism between the device and the user, providing the user with information about the status of the sensor. In particular, the display device 1702 may include a touch-sensitive layer to allow interaction from the user. Sensor 1700 may be in a remote location where access to power is limited, and thus a low power display is greatly beneficial.

Many devices are being built and deployed as standalone devices running on limited battery power and thus a low power display such as the display device of the present disclosure may be preferable.

Figure 18:
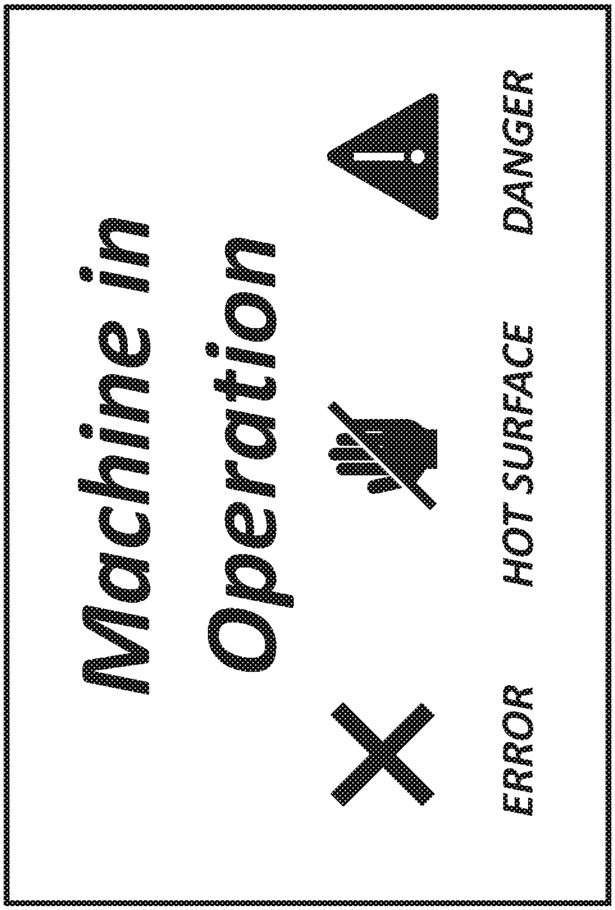
FIG. 18 is a schematic diagram of an example signage display disposed on industrial equipment.

FIG. 18 is a schematic diagram of an example application of a signage display 1800 used on a piece of industrial equipment, which can display different messages to users depending on the status of the equipment. Such messages may be used to warn the user of hazards. The display device 1800 might use a vivid color such as red or orange to attract a user's attention to better warn them of dangers. The display device 1800 may include a plurality of driven electrodes, and in particular, segmented according to standard warning symbols or messages. Additionally, the display device 1800 may employ filler material in designated static regions. This may allow the display device 1800 to be optimized to reduce the amount of electrophoretic dispersion required, as well as creating clean lines at the segmented driven electrodes.

The scope of the claims should not be limited by the embodiments set forth in the above examples, but should be given the broadest interpretation consistent with the description as a whole.

The invention claimed is:

1. An electrophoretic display device comprising:

an outer substrate and an inner substrate; and at least one color-changing layer configured to switch between a clear state and a colored state, the at least one color-changing layer comprising:

a plurality of driven electrodes and at least one reference electrode, the driven electrodes and the reference electrode disposed in a spaced apart relationship between the inner substrate and the outer substrate;

a plurality of microstructures disposed between the driven electrodes and the reference electrode, the microstructures containing an electrophoretic media, the electrophoretic media comprising a first chemical entity having a first charge and a second chemical entity having a second charge opposite the first charge, the first and second chemical entities inducible to reversibly switch between:

(i) a separated state, wherein the electrophoretic media is clear by the first and second chemical entities being separated relative to each other, and (ii) an optically active state, wherein the first and second chemical entities form a complex; and wherein the electrophoretic media is colored, in response to a change in an electromagnetic field;

a controller coupled to the driven electrodes, the controller configured to:

obtain image data representing an image to be displayed by the electrophoretic display device, select a subset of the driven electrodes based on a mapping of the image data to the driven electrodes and a target optical property of the image data;

drive the subset of driven electrodes to induce a voltage difference to change the electromagnetic field applied to the electrophoretic media in the microstructures aligned with the subset of driven electrodes; and a light source configured to emit light towards the at least one color-changing layer, wherein the electrophoretic media having the first and second chemical entities in the optically active state selectively absorbs wavelengths of the light emitted by the light source to achieve the colored state.

2. The electrophoretic display device of claim 1, further comprising additional color-changing layers, each additional color-changing layer comprising:

an additional plurality of driven electrodes and at least one additional reference electrode; the additional driven electrodes and the additional reference electrode disposed in a spaced apart relationship between the inner substrate and the outer substrate;

a plurality of additional microstructures disposed between the additional driven electrodes and the additional reference electrode, the additional microstructures containing an additional electrophoretic media; and an additional controller coupled to the additional driven electrodes, the additional controller to select an additional subset of additional driven electrodes and drive the additional subset of additional driven electrode to induce a voltage difference to change an additional electromagnetic field applied to the additional electrophoretic media in the additional microstructures aligned with the additional subset of additional driven electrodes.

3. The electrophoretic display device of claim 1, wherein the plurality of driven electrodes comprises a plurality of segments, each segment connected to the controller via a trace; and wherein the controller is to selectively drive the segments to form a segmented display image.

4. The electrophoretic display device of claim 1, wherein the plurality of driven electrode comprises an array of pixel driven electrodes, each pixel driven electrode corresponding to a pixel of the electrophoretic display device.

5. The electrophoretic display device of claim 4, further comprising a plurality of select lines and data lines coupled to the controller; and wherein the controller is to cycle through the select lines and the data lines to selectively drive the pixel driven electrodes to build an image at the electrophoretic display device.

6. The electrophoretic display device of claim 1, wherein the at least one color-changing layer comprises a filler material disposed between the driven electrodes and the reference electrode and located at designated static regions of the display device.

7. The electrophoretic display device of claim 6, wherein the filler material includes voids located at regions designated for color formation, the voids configured to receive the microstructures containing the electrophoretic dispersion.

8. The electrophoretic display device of claim 1, wherein the inner and outer substrates, and the driven and reference electrodes are substantially transparent to allow light to be transmitted therethrough.

9. The electrophoretic display device of claim 1, wherein the light source is disposed adjacent to the outer substrate and further comprising a reflecting layer disposed adjacent to the inner substrate;

wherein the light emitted by the light source is configured to be directed for a first pass through the at least one color-changing layer towards the reflecting layer and reflected for a second pass through the at least one-color changing layer by the reflecting layer, wherein the two passes enhance the absorption of the wavelengths of the light emitted by the light source by the electrophoretic media having the first and second chemical entities in the optically active complex state.

10. The electrophoretic display device of claim 1, wherein the light source is disposed adjacent to the inner substrate;

wherein the light emitted by the light source is directed for a first pass through the at least one color-changing layer.

11. An electrophoretic display device comprising:

an outer substrate and an inner substrate; and at least one color-changing layer configured to switch between a clear state and a colored state, the at least one color-changing layer comprising:

a driven electrode and a reference electrode, the driven electrode and the reference electrode disposed in a spaced apart relationship between the inner substrate and the outer substrate;

a plurality of microstructures disposed between the driven electrode and the reference electrode, the microstructures containing an electrophoretic media, the electrophoretic media comprising a first chemical entity having a first charge and a second chemical entity having a second charge opposite the first charge, the first and second chemical entities inducible to reversibly switch between:

(i) a separated state, wherein the electrophoretic media is clear by the first and second chemical entities being separated relative to each other, and (ii) an optically active state, wherein the first and second chemical entities form a complex; and wherein the electrophoretic media is colored, in response to a change in an electromagnetic field; and a controller coupled to the driven electrode, the controller configured to drive the driven electrode to induce a voltage difference to change the electromagnetic field applied to the electrophoretic media;

a light source configured to emit light towards the at least one color-changing layer, wherein the electrophoretic media having the first and second chemical entities in the optically active state selectively absorbs wavelengths of the light emitted by the light source to achieve the colored state; and a light transformation layer configured to transform the light passing through the color-changing layer according to a viewing parameter.

12. The electrophoretic display device of claim 11, wherein the light transformation layer comprises a light reflecting layer adjacent to the inner substrate, the light reflecting layer to reflect light back through the color-changing layer to a viewer.

13. The electrophoretic display device of claim 12, wherein the light reflecting layer exhibits an approximately Lambertian reflection profile.

14. The electrophoretic display device of claim 12, wherein the light reflecting layer comprises a scattering layer having particles having a refractive index of below about 1.45 embedded in a matrix layer having a refractive index of above about 2.0.

15. The electrophoretic display device of claim 12, wherein the light reflecting layer exhibits purely specular reflection.

16. The electrophoretic display device of claim 12, wherein the light source is adjacent to the outer substrate, and further comprising a light scattering layer adjacent to the outer substrate, wherein the light scattering layer is configured to receive the light from the light source and scatter the light to be emitted into the color-changing layer toward the light reflecting layer.

17. The electrophoretic display device of claim 11, wherein the light transformation layer comprises a back light dispersion layer adjacent to the inner substrate, wherein the back light dispersion layer is configured to receive light from the light source and emit light into the color-changing layer towards a viewer.

18. The electrophoretic display device of claim 11, wherein the light transformation layer comprises a polymer dispersed liquid crystal layer configured to switch between a substantially transparent state and a substantially reflective state.

19. The electrophoretic display device of claim 11, wherein the inner and outer substrates, the driven and reference electrodes, and the light transformation layer are substantially transparent to allow light to be transmitted therethrough.

* * * * *